United States Patent
Shirayama et al.

(10) Patent No.: US 10,969,705 B2
(45) Date of Patent: Apr. 6, 2021

(54) TWO-COMPONENT DEVELOPER

(71) Applicant: CANON KABUSHIKI KAISHA, Tokyo (JP)

(72) Inventors: Kazuhisa Shirayama, Abiko (JP); Hayato Ida, Toride (JP); Takeshi Hashimoto, Moriya (JP); Kentaro Kamae, Kashiwa (JP); Takashi Matsui, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/438,544

(22) Filed: Jun. 12, 2019

(65) Prior Publication Data

US 2019/0384202 A1     Dec. 19, 2019

(30) Foreign Application Priority Data

Jun. 13, 2018 (JP) .............................. JP2018-113105
Apr. 10, 2019 (JP) .............................. JP2019-074933

(51) Int. Cl.
    *G03G 9/08*          (2006.01)
    *G03G 9/107*        (2006.01)
    (Continued)

(52) U.S. Cl.
    CPC ......... *G03G 9/1075* (2013.01); *C08F 218/08* (2013.01); *C08F 220/46* (2013.01);
    (Continued)

(58) Field of Classification Search
    CPC ............... G03G 9/1075; G03G 9/1133; G03G 9/08733; G03G 9/08711; G03G 9/08795;
    (Continued)

(56) References Cited

U.S. PATENT DOCUMENTS 7,678,523 B2    3/2010    Hiroko et al.
7,842,446 B2   11/2010    Yanase et al.
                        (Continued)

FOREIGN PATENT DOCUMENTS

EP      0 703 505      3/1996
EP      0 744 668    11/1996
           (Continued)

OTHER PUBLICATIONS

U.S. Appl. No. 16/438,537, Kentaro Kamae, filed Jun. 12, 2019.
(Continued)

*Primary Examiner* — Mark A Chapman
(74) *Attorney, Agent, or Firm* — Venable LLP

(57) ABSTRACT

Provided is a two-component developer has a toner including a toner particle including a binder resin, and a magnetic carrier, wherein the binder resin includes a polymer A having a first monomer unit derived from a first polymerizable monomer, and a second monomer unit derived from a second polymerizable monomer different from the first polymerizable monomer, the first polymerizable monomer is a specific (meth)acrylic acid ester, a content and an SP value of the first and second monomer units in the polymer A fall within respective specific ranges, the magnetic carrier has a magnetic core and a coating resin of the surface of the magnetic core, the coating resin includes a polymer B having monomer units (a) and (b), each SP value of the monomer units (a) and (b) is a specific value.

23 Claims, 2 Drawing Sheets

(51) Int. Cl.
*C08F 218/08* (2006.01)
*C08F 220/46* (2006.01)
*C08F 220/68* (2006.01)
*G03G 9/087* (2006.01)
*G03G 9/113* (2006.01)

(52) U.S. Cl.
CPC ....... *C08F 220/68* (2013.01); *G03G 9/08706* (2013.01); *G03G 9/08708* (2013.01); *G03G 9/08711* (2013.01); *G03G 9/08713* (2013.01); *G03G 9/08722* (2013.01); *G03G 9/08724* (2013.01); *G03G 9/08728* (2013.01); *G03G 9/08731* (2013.01); *G03G 9/08733* (2013.01); *G03G 9/08791* (2013.01); *G03G 9/1133* (2013.01); *G03G 9/1137* (2013.01)

(58) Field of Classification Search
CPC ........... G03G 9/08791; G03G 9/08731; G03G 9/08728; G03G 9/08726; G03G 9/08724; G03G 9/08722; G03G 9/08713; G03G 9/08708; G03G 9/08706; G03G 9/1137; C08F 220/68; C08F 220/46; C08F 218/08
USPC ...................................................... 430/109.3
See application file for complete search history.

(56) References Cited

U.S. PATENT DOCUMENTS

| | | | |
|---|---|---|---|
| 7,923,190 B2 | 4/2011 | Magome et al. | |
| 7,935,467 B2 | 5/2011 | Dojo et al. | |
| 8,084,174 B2 | 12/2011 | Hasegawa et al. | |
| 8,323,726 B2 | 12/2012 | Naka et al. | |
| 8,426,091 B2 | 4/2013 | Magome et al. | |
| 8,426,094 B2 | 4/2013 | Magome et al. | |
| 8,614,044 B2 | 12/2013 | Matsui et al. | |
| 8,778,585 B2 | 7/2014 | Matsui et al. | |
| 8,841,054 B2 | 9/2014 | Dojo et al. | |
| 8,883,389 B2 | 11/2014 | Matsui et al. | |
| 8,921,023 B2 | 12/2014 | Baba et al. | |
| 8,927,188 B2 | 1/2015 | Naka et al. | |
| 8,974,994 B2 | 3/2015 | Kamae et al. | |
| 8,986,914 B2 | 3/2015 | Fujikawa et al. | |
| 9,057,970 B2 | 6/2015 | Ida et al. | |
| 9,058,924 B2 | 6/2015 | Komatsu et al. | |
| 9,063,443 B2 | 6/2015 | Ishigami et al. | |
| 9,097,997 B2 | 8/2015 | Nomura et al. | |
| 9,152,088 B1 | 10/2015 | Kobori et al. | |
| 9,213,250 B2 | 12/2015 | Nomura et al. | |
| 9,217,943 B2 | 12/2015 | Matsui et al. | |
| 9,239,528 B2 | 1/2016 | Hasegawa et al. | |
| 9,304,422 B2 | 4/2016 | Matsui et al. | |
| 9,348,246 B2 | 5/2016 | Magome et al. | |
| 9,348,247 B2 | 5/2016 | Ida et al. | |
| 9,348,253 B2 | 5/2016 | Kanno et al. | |
| 9,354,545 B2 | 5/2016 | Matsui et al. | |
| 9,417,540 B2 | 8/2016 | Hashimoto et al. | |
| 9,436,112 B2 | 9/2016 | Iwasaki et al. | |
| 9,442,416 B2 | 9/2016 | Magome et al. | |
| 9,442,419 B2 | 9/2016 | Wakabayashi et al. | |
| 9,540,483 B2 | 1/2017 | Ida et al. | |
| 9,581,934 B2 | 2/2017 | Ito et al. | |
| 9,651,883 B2 | 5/2017 | Hama et al. | |
| 9,658,546 B2 | 5/2017 | Tanaka et al. | |
| 9,665,023 B2 | 5/2017 | Kamae et al. | |
| 9,696,644 B2 | 7/2017 | Ida et al. | |
| 9,857,707 B2 | 1/2018 | Tsuda et al. | |
| 9,897,934 B2 | 2/2018 | Tamura et al. | |
| 9,904,195 B2 | 2/2018 | Matsui et al. | |
| 9,915,885 B2 | 3/2018 | Katsumata et al. | |
| 9,969,834 B2 | 5/2018 | Ohtsu et al. | |
| 10,012,918 B2 | 7/2018 | Ishigami et al. | |
| 10,012,919 B2 | 7/2018 | Matsui et al. | |
| 10,012,920 B2 | 7/2018 | Shibata et al. | |
| 10,012,921 B2 | 7/2018 | Kamae et al. | |
| 10,036,970 B2 | 7/2018 | Kanno et al. | |
| 10,078,281 B2 | 9/2018 | Ida et al. | |
| 10,082,743 B2 | 9/2018 | Hama et al. | |
| 10,088,765 B2 | 10/2018 | Miyakai et al. | |
| 10,133,201 B2 | 11/2018 | Kamae et al. | |
| 10,146,146 B2 | 12/2018 | Komatsu et al. | |
| 10,156,800 B2 | 12/2018 | Tsuda et al. | |
| 10,175,595 B2 | 1/2019 | Onozaki et al. | |
| 10,197,934 B2 | 2/2019 | Matsui et al. | |
| 10,197,936 B2 | 2/2019 | Onozaki et al. | |
| 10,203,619 B2 | 2/2019 | Yamashita et al. | |
| 10,216,108 B2 | 2/2019 | Iwasaki et al. | |
| 10,228,629 B2 | 3/2019 | Tamura et al. | |
| 10,234,777 B2 | 3/2019 | Ohtsu et al. | |
| 10,241,430 B2 | 3/2019 | Kimura et al. | |
| 10,274,851 B2 | 4/2019 | Hashimoto et al. | |
| 10,353,312 B2 | 7/2019 | Kamae et al. | |
| 10,401,748 B2 | 9/2019 | Hashimoto et al. | |
| 2002/0055050 A1* | 5/2002 | Serizawa ........... | G03G 9/09791 430/108.4 |
| 2004/0185367 A1 | 9/2004 | Serizawa et al. | |
| 2007/0166636 A1 | 7/2007 | Daimon et al. | |
| 2009/0087768 A1 | 4/2009 | Tosaka et al. | |
| 2009/0197192 A1 | 8/2009 | Hiroko et al. | |
| 2013/0108955 A1 | 5/2013 | Shibata et al. | |
| 2013/0244159 A1 | 9/2013 | Ishigami et al. | |
| 2013/0288173 A1 | 10/2013 | Hashimoto et al. | |
| 2014/0038098 A1 | 2/2014 | Naka et al. | |
| 2014/0134535 A1 | 5/2014 | Baba et al. | |
| 2014/0272699 A1 | 9/2014 | Minaki et al. | |
| 2014/0308611 A1 | 10/2014 | Shimano et al. | |
| 2014/0329176 A1 | 11/2014 | Kanno et al. | |
| 2014/0356782 A1* | 12/2014 | Sugahara ............. | G03G 9/1132 430/111.35 |
| 2015/0099227 A1 | 4/2015 | Ida et al. | |
| 2015/0185658 A1 | 7/2015 | Wakabayashi et al. | |
| 2016/0282742 A1* | 9/2016 | Uchino ............... | G03G 9/0821 |
| 2017/0045834 A1 | 2/2017 | Shirai et al. | |
| 2017/0269496 A1 | 9/2017 | Kubo et al. | |
| 2017/0315463 A1 | 11/2017 | Onozaki et al. | |
| 2018/0143557 A1 | 5/2018 | Ueda et al. | |
| 2018/0259867 A1 | 9/2018 | Sano et al. | |
| 2018/0275540 A1 | 9/2018 | Matsuo et al. | |
| 2018/0314176 A1 | 11/2018 | Ikeda et al. | |
| 2018/0356746 A1 | 12/2018 | Hama et al. | |
| 2018/0364601 A1 | 12/2018 | Onozaki et al. | |
| 2019/0107793 A1 | 4/2019 | Tamura et al. | |
| 2019/0113858 A1 | 4/2019 | Kamae et al. | |
| 2019/0171125 A1 | 6/2019 | Kanno et al. | |

FOREIGN PATENT DOCUMENTS

| | | |
|---|---|---|
| EP | 1 494 087 | 1/2005 |
| EP | 2 626 745 | 8/2013 |
| EP | 2 843 473 | 3/2015 |
| JP | 2000-250264 | 9/2000 |
| JP | 2011-094137 | 5/2011 |
| JP | 2013-228724 | 11/2013 |
| JP | 2014-130243 | 7/2014 |
| JP | 2014-174454 | 9/2014 |
| JP | 2014-222259 | 11/2014 |

OTHER PUBLICATIONS

U.S. Appl. No. 16/438,541, Takeshi Hashimoto, filed Jun. 12, 2019.
U.S. Appl. No. 16/438,545, Kenta Kamikura, filed Jun. 12, 2019.
U.S. Appl. No. 16/438,553, Kenji Aoki, filed Jun. 12, 2019.
U.S. Appl. No. 16/438,566, Takashi Matsui, filed Jun. 12, 2019.
U.S. Appl. No. 16/438,605, Daisuke Yoshiba, filed Jun. 12, 2019.
U.S. Appl. No. 16/438,611, Hiroki Kagawa, filed Jun. 12, 2019.
U.S. Appl. No. 16/438,623, Tatsuya Saeki, filed Jun. 12, 2019.
Fedors, "A Method for Estimating Both the Solubility Parameters and Molar Volumes of Liquids", Polymer Engineering And Science, vol. 14, No. 2 (1974) 147-54.
U.S. Appl. No. 16/203,864, Takeshi Ohtsu, dated Nov. 29, 2018.
U.S. Appl. No. 16/438,537, Kentaro Kamae, dated Jun. 12, 2019.
U.S. Appl. No. 16/438,541, Takeshi Hashimoto, dated Jun. 12, 2019.

(56) References Cited

OTHER PUBLICATIONS

U.S. Appl. No. 16/438,545, Kenta Kamikura, dated Jun. 12, 2019.
U.S. Appl. No. 16/438,553, Kenji Aoki, dated Jun. 12, 2019.
U.S. Appl. No. 16/438,566, Takashi Matsui, dated Jun. 12, 2019.
U.S. Appl. No. 16/438,605, Daisuke Yoshiba, dated Jun. 12, 2019.
U.S. Appl. No. 16/438,611, Hiroki Kagawa, dated Jun. 12, 2019.
U.S. Appl. No. 16/438,623, Tatsuya Saeki, dated Jun. 12, 2019.
U.S. Appl. No. 16/532,887, Ryuji Murayama, dated Aug. 6, 2019.
U.S. Appl. No. 16/534,343, Kentaro Kamae, dated Aug. 7, 2019.
U.S. Appl. No. 16/550,410, Masayuki Hama, dated Aug. 26, 2019.

* cited by examiner

TWO-COMPONENT DEVELOPER

BACKGROUND OF THE INVENTION

Field of the Invention

The present invention relates to a two-component developer for use in an electrophotographic system, an electrostatic recording system, an electrostatic printing system, and a toner jet system.

Description of the Related Art

In recent years, as a full-color copier of an electrophotographic system has come into wide use, a demand for higher-speed printing and adaptation to energy conservation has been further increased. For adaptation to high-speed printing, a study has been conducted on a technology of melting a toner more rapidly in a fixing step. Whereas, for improving the productivity, a study has been conducted on a technology of shortening the time for various controls during one job or between jobs. Further, as a countermeasure for energy conservation, a study has been conducted on a technology of fixing a toner at a lower temperature in order to reduce the power consumption in a fixing step.

For adaptation to high-speed printing, and improvement of low-temperature fixability, there is a method in which the glass transition point or the softening point of a binder resin of a toner is reduced, and a binder resin having a sharp melt property is used. In recent years, further, as a resin having a sharp melt property, a large number of toners containing crystalline polyester have been proposed. However, crystalline polyester is a material having a problem in terms of charging stability at high-temperature high-humidity environment, particularly keeping the charging performance after standing in high-temperature high-humidity environment.

In order to solve such a problem, even when a toner with high low-temperature fixability is used, a carrier for a two-component developer capable of improving the charging performance of the toner has been under development.

For example, in Japanese Patent Application Laid-open No. 2014-174454, in order to stabilize the charging performance of a toner using a crystalline polyester resin, a resin with high charging performance is used as a resin for coating a carrier, thereby improving the charging performance.

On the other hand, various toners using a crystalline vinyl type resin as a crystalline resin having a sharp melt property have been proposed.

For example, Japanese Patent Application Laid-open No. 2014-130243 proposes a toner which combines the low-temperature fixability and the charging performance by using an acrylic resin having crystallinity at the side chain.

SUMMARY OF THE INVENTION

However, the carrier described in Japanese Patent Application Laid-open No. 2014-174454 was found to be undesirably slow in the rise-up of charging.

Further, it has become clear that the two-component developer using a crystalline vinyl type resin as a binder resin as in Japanese Patent Application Publication No. 2014-130243 is also slow in the rise-up of charging.

When the rise-up of charging is slow, upon printing an image with a high printing ratio immediately after printing an image with a low image printing ratio, the difference in charging amount between the toner present in the developing machine and the toner newly supplied into the developing machine gradually changes the image density. This tendency is particularly remarkable in low-humidity environment.

The present invention provides a two-component developer which resolved the problem. Specifically, the present invention provides a two-component developer having charging stability even in high-temperature high-humidity environment, and less likely to cause a change in density not depending upon the image printing ratio, and fast in the rise-up of charging.

A first aspect of the present invention is a two-component developer having:

a toner including a toner particle that includes a binder resin; and a magnetic carrier; wherein:

the binder resin includes a polymer A having a first monomer unit derived from a first polymerizable monomer, and a second monomer unit derived from a second polymerizable monomer that is different from the first polymerizable monomer;

the first polymerizable monomer is at least one selected from the group consisting of (meth)acrylic acid esters each having a $C_{18-36}$ alkyl group;

a content of the first monomer unit in the polymer A is 5.0 mol % to 60.0 mol % based on the total number of moles of all the monomer units in the polymer A;

a content of the second monomer unit in the polymer A is 20.0 mol % to 95.0 mol % based on the total number of moles of all the monomer units in the polymer A;

assuming that an SP value of the first monomer unit is taken as $SP_{11}$ $(J/cm^3)^{0.5}$ and an SP value of the second monomer unit is taken as $SP_{21}$ $(J/cm^3)^{0.5}$, the following formulae (1) and (2):

$$3.00 \leq (SP_{21} - SP_{11}) \leq 25.00 \quad (1)$$

$$21.00 \leq SP_{21} \quad (2)$$

are satisfied;

the magnetic carrier has a magnetic core and a coating resin of the surface of the magnetic core, the coating resin includes a polymer B that includes a monomer unit (a) derived from a polymerizable monomer (a), and a monomer unit (b) derived from a polymerizable monomer (b) that is different from the polymerizable monomer (a); and assuming that an SP value of the monomer unit (a) is taken as $SP(a)$ $(J/cm^3)^{0.5}$, and an SP value of the monomer unit (b) is taken as $SP(b)$ $(J/cm^3)^{0.5}$, the following formulae (3) and (4):

$$20.30 \leq SP(a) \leq 22.00 \quad (3)$$

$$19.00 \leq SP(b) \leq 20.20 \quad (4)$$

are satisfied.

A second aspect of the present invention is a two-component developer having:

a toner including a toner particle that includes a binder resin; and a magnetic carrier; wherein:

the binder resin includes a polymer A that is a polymer derived from a composition containing a first polymerizable monomer, and a second polymerizable monomer that is different from the first polymerizable monomer, the first polymerizable monomer is at least one selected from the group consisting of (meth)acrylic acid esters having a $C_{18-36}$ alkyl group, a content of the first polymerizable monomer in the composition is 5.0 mol % to 60.0 mol % based on the total number of moles of all polymerizable monomers in the composition, a content of the second polymerizable monomer in the composition is 20.0 mol % to 95.0 mol % based on the total number of moles of all polymerizable monomers in the composition, assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, the following formulae (5) and (6):

$$0.60 \leq (SP_{22} - SP_{12}) \leq 15.00 \tag{5}$$

$$18.30 \leq SP_{22} \tag{6}$$

are satisfied:

the magnetic carrier has a magnetic core and a coating resin of the surface of the magnetic core, the coating resin includes a polymer B having a monomer unit (a) derived from a polymerizable monomer (a), and a monomer unit (b) derived from a polymerizable monomer (b) different from the polymerizable monomer (a), and assuming that an SP value of the monomer unit (a) is taken as SP(a) $(J/cm^3)^{0.5}$, and an SP value of the monomer unit (b) is taken as SP(b) $(J/cm^3)^{0.5}$, the following formulae (3) and (4):

$$20.30 \leq SP(a) \leq 22.00 \tag{3}$$

$$19.00 \leq SP(b) \leq 20.20 \tag{4}$$

are satisfied.

In accordance with the present invention, it is possible to provide a two-component developer having charging stability even in high-temperature high-humidity environment, and is less likely to cause a change in density not depending upon the image printing ratio, and fast in the rise-up of charging.

Further features of the present invention will become apparent from the following description of exemplary embodiments with reference to the attached drawing.

DESCRIPTION OF THE EMBODIMENTS

Figure 1:
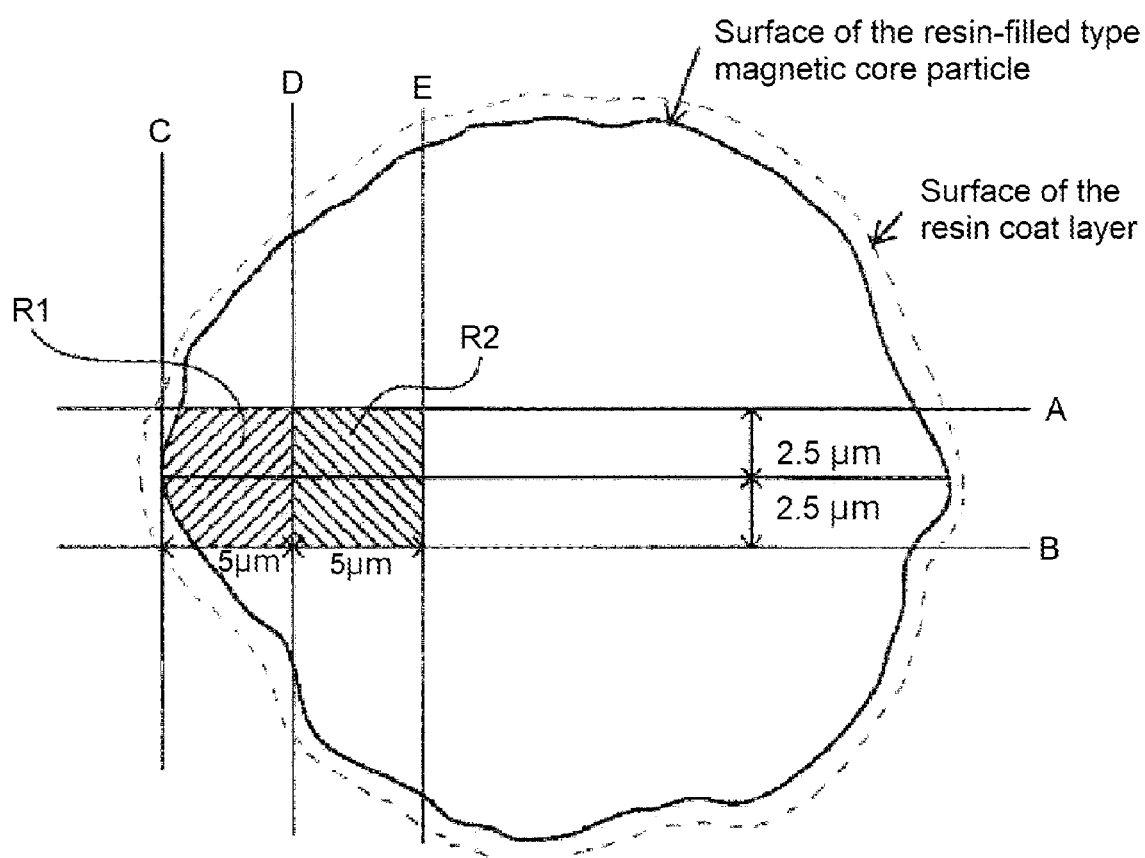
FIG. 1 is an explanatory drawing of regions R1 and R2 in accordance with a magnetic carrier of a two-component developer of the present invention.

In the present invention, the expression "from XX to YY" or "XX to YY" indicating the numerical value range means the numerical value range including the lower limit and the upper limit of endpoints, unless otherwise specified.

In the present invention, (meth)acrylic acid ester means acrylic acid ester and/or methacrylic acid ester.

In the present invention, a "monomer unit" includes one block of carbon-carbon bond in the main chain of polymerized vinyl type monomers in the polymer as one unit. A vinyl type monomer can be expressed by the following formula (Z).

$R_{Z1}$ in the formula (Z) represents a hydrogen atom, or an alkyl group (preferably a $C_{1-3}$ alkyl group, and more preferably a methyl group), and $R_{Z2}$ represents a given substituent.

The crystalline resin represents a resin showing a clear endothermic peak in differential scanning calorimeter (DSC) measurement.

A first aspect of the present invention is a two-component developer having:

a toner including a toner particle that includes a binder resin; and a magnetic carrier; wherein:

the binder resin includes a polymer A having a first monomer unit derived from a first polymerizable monomer, and a second monomer unit derived from a second polymerizable monomer that is different from the first polymerizable monomer;

the first polymerizable monomer is at least one selected from the group consisting of (meth)acrylic acid esters each having a $C_{18-36}$ alkyl group;

a content of the first monomer unit in the polymer A is 5.0 mol % to 60.0 mol % based on the total number of moles of all the monomer units in the polymer A;

a content of the second monomer unit in the polymer A is 20.0 mol % to 95.0 mol % based on the total number of moles of all the monomer units in the polymer A;

assuming that an SP value of the first monomer unit is taken as $SP_{11}$ $(J/cm^3)^{0.5}$ and an SP value of the second monomer unit is taken as $SP_{21}$ $(J/cm^3)^{0.5}$, the following formulae (1) and (2):

$$3.00 \leq (SP_{21} - SP_{11}) \leq 25.00 \tag{1}$$

$$21.00 \leq SP_{21} \tag{2}$$

are satisfied;

the magnetic carrier has a magnetic core and a coating resin of the surface of the magnetic core, the coating resin includes a polymer B that includes a monomer unit (a) derived from a polymerizable monomer (a), and a monomer unit (b) derived from a polymerizable monomer (b) that is different from the polymerizable monomer (a); and assuming that an SP value of the monomer unit (a) is taken as SP(a) $(J/cm^3)^{0.5}$, and an SP value of the monomer unit (b) is taken as SP(b) $(J/cm^3)^{0.5}$, the following formulae (3) and (4):

$$20.30 \leq SP(a) \leq 22.00 \tag{3}$$

$$19.00 \leq SP(b) \leq 20.20 \tag{4}$$

are satisfied.

A second aspect of the present invention is a two-component developer having:

a toner including a toner particle that includes a binder resin; and a magnetic carrier; wherein:

the binder resin includes a polymer A that is a polymer derived from a composition containing a first polymerizable monomer, and a second polymerizable monomer that is different from the first polymerizable monomer, the first polymerizable monomer is at least one selected from the group consisting of (meth)acrylic acid esters having a $C_{18-36}$ alkyl group, a content of the first polymerizable monomer in the composition is 5.0 mol % to 60.0 mol % based on the total number of moles of all polymerizable monomers in the composition, a content of the second polymerizable monomer in the composition is 20.0 mol % to 95.0 mol % based on the total number of moles of all polymerizable monomers in the composition, assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, the following formulae (5) and (6):

$$0.60 \leq (SP_{22} - SP_{12}) \leq 15.00 \tag{5}$$

$$18.30 \leq SP_{22} \tag{6}$$

are satisfied:

the magnetic carrier has a magnetic core and a coating resin of the surface of the magnetic core, the coating resin includes a polymer B having a monomer unit (a) derived from a polymerizable monomer (a), and a monomer unit (b) derived from a polymerizable monomer (b) different from the polymerizable monomer (a), and assuming that an SP value of the monomer unit (a) is taken as $SP(a)$ $(J/cm^3)^{0.5}$, and an SP value of the monomer unit (b) is taken as $SP(b)$ $(J/cm^3)^{0.5}$, the following formulae (3) and (4):

$$20.30 \leq SP(a) \leq 22.00 \tag{3}$$

$$19.00 \leq SP(b) \leq 20.20 \tag{4}$$

are satisfied.

The present inventors consider the mechanism in which the effects of the present invention are expressed as follows.

The speed of rise-up of charging of a two-component developer is considered to be determined by the frequency of movement of electric charges from the carrier particle surface to the toner particle surface. Conventionally, it is known that, by coating the surface of a carrier particle with a resin having a high polarity, it is possible to increase the rise-up speed of charging of the toner particle.

However, a study by the present inventors has indicated that when a crystalline vinyl type resin is used as a binder resin, only this does not result in a sufficient increase in rise-up speed of charging of the toner particle. This is considered due to the fact that movement of electric charges from the carrier particle surface to the toner particle surface, or spread of electric charges from the local part where movement of electric charges has been caused to the whole toner particle, or to the whole carrier particle becomes rate-limiting.

A change in composition of the binder resin was studied. As a result, it has been indicated that the presence of a monomer unit with a high SP value in the crystalline vinyl type resin slightly improves the rise-up of charging. It is considered that the presence of a monomer unit with a high SP value makes it easier for electric charges to move from the carrier particle surface to the toner particle surface at the local part where a monomer unit with a high polarity is present of the toner particle surface. However, the charging maintaining property under high-temperature high-humidity environment may be reduced according to the composition.

The present inventors have conducted a close study, and have found the following fact: the problem can be resolved by controlling the molar ratio, the SP value, and the difference in SP value of each monomer unit derived from a plurality of polymerizable monomers of the binder resin, and the molar ratio and the SP value of each monomer unit derived from a plurality of polymerizable monomers of the coating resin of the carrier particle surface within respective specific ranges. This has led to the present invention.

When a monomer unit with a high SP value is present in the vinyl type resin included in the binder resin of a toner particle, a monomer unit with a low SP value and a monomer unit with a high SP value are present at the surface of the toner particle. Further, the magnetic carrier has a magnetic core and a coating resin of the surface of the magnetic core. When two or more monomer units having different SP values are present at the coating resin, a monomer unit with a low SP value and a monomer unit with a high SP value are present at the surface.

It has been found that when the conditions are satisfied, the rise-up speed of charging of a developer increases. Further, it has been found that the charging maintaining property under high-temperature high-humidity environment is improved. The mechanism thereof is presumed as follows.

As described previously, it is considered that the movement of electric charges from the carrier particle surface to the toner particle surface tends to occur mainly when the polar part of the coating resin at the carrier particle surface and the polar part of the toner particle surface are in contact with each other. Whereas, at the non-polar part of the coating resin at the carrier particle surface, and the non-polar part at the toner particle surface, the hydrophobicity is high, respectively, and hence proximity to each other can be caused with ease without water interposed therebetween.

Conceivably, the action thereof further increased the frequency of movement of electric charges from the coating resin at the carrier particle surface to the toner particle surface, resulting in an improvement of the rise-up speed of charging of the developer. Namely, it is considered that respective interactions between the polar part present at the toner particle surface and the polar part present at the coating resin at the carrier particle surface, and between the non-polar part present at the toner particle surface and the non-polar part present at the coating resin at the carrier particle surface improved the rise-up speed of charging of the developer.

Further, when monomer units with a high SP value, and monomer units with a low SP value aggregate, respectively, to form a structure similar to that of a block copolymer at the toner particle surface, conceivably, the presence of the block of the polar parts at the toner particle surface allows a plurality of polar groups adjacent in the block to hold electrons in a delocalized manner, resulting in an improvement of the charging maintaining property under high-temperature high-humidity environment.

Here, also for the coating resin at the carrier particle surface, monomer units with a high SP value, and monomer units with a low SP value may aggregate, respectively, to form a structure similar to that of a block copolymer. In this case, in view of the difference in size between the carrier particle and the toner particle, when the size of the block of the coating resin at the carrier particle surface is smaller than the area of the contact part between the carrier particle surface and the toner particle surface, respective interactions between the polar part present at the toner particle surface and the polar part present at the coating resin at the carrier particle surfaces, and between the non-polar part present at the toner particle surface and the non-polar part present at the coating resin at the carrier particle surfaces are improved. Accordingly, it is considered that the size of the block of the coating resin at the carrier particle surface is preferably smaller than the area of the contact part between the carrier particle surface and the toner particle surface.

In the first aspect, the polymer A has a first monomer unit derived from a first polymerizable monomer, and a second monomer unit derived from a second polymerizable monomer different from the first polymerizable monomer, and assuming that an SP value of the first monomer unit is taken as $SP_{11}$ $(J/cm^3)^{0.5}$ and an SP value of the second monomer unit is taken as $SP_{21}$ $(J/cm^3)^{0.5}$, the following formula (1):

$$3.00 \leq (SP_{21} - SP_{11}) \leq 25.00 \quad (1)$$

is satisfied.

Whereas, in the second aspect, assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, the following formulae (5):

$$0.60 \leq (SP_{22} - SP_{12}) \leq 15.00 \quad (5)$$

is satisfied.

By satisfying the difference in SP value, the polymer A tends to form a structure similar to that of a block copolymer, so that the melting point is kept. As a result, low-temperature fixability is attained in addition to the improvement of the rise-up speed of charging of the developer, and the charging maintaining property under high-temperature high-humidity environment. This mechanism is presumed as follows.

The first monomer unit is incorporated into the polymer A, and the first monomer units aggregate, thereby forming a structure similar to that of a block copolymer. In a common case, incorporation of other monomer units inhibits blocking. For this reason, blockability becomes less likely to be expressed as a polymer. This tendency becomes remarkable when the first monomer unit and the other monomer units randomly bond with each other in one molecule of the polymer.

On the other hand, in the present invention, conceivably, by using a polymerizable monomer with $SP_{22}$–$SP_{12}$ falling within the formula (5), the first polymerizable monomer and the second polymerizable monomer do not randomly bond with each other, but bond with each other continuously to a certain degree for polymerization. As a result, conceivably, for the polymer A, the first monomer units become able to aggregate, and even when other monomer units are incorporated therein, the crystallinity can be enhanced, and hence the melting point can also be kept.

The polymer A preferably has a crystalline segment including a first monomer unit derived from a first polymerizable monomer. Further, the polymer A preferably has an amorphous segment including a second monomer unit derived from a second polymerizable monomer.

The lower limit of $SP_{21}$–$SP_{11}$ is preferably 4.00 or more, and more preferably 5.00 or more. The upper limit of $SP_{21}$–$SP_{11}$ is preferably 20.00 or less, and more preferably 15.00 or less.

On the other hand, the lower limit of $SP_{22}$–$SP_{12}$ is preferably 2.00 or more, and more preferably 3.00 or more. The upper limit of $SP_{22}$–$SP_{12}$ is preferably 10.00 or less, and more preferably 7.00 or less.

Further, conceivably, the difference in SP value falls within the range; as a result, for the polymer A, the first monomer unit and the second monomer unit may form a clear phase separated state without becoming compatible with each other. Thus, it is considered that the melting point is kept without reducing the crystallinity.

When the difference in SP value is smaller than the lower limit, the crystallinity of the polymer A is reduced, resulting in reduction of the charging maintaining property under high-temperature high-humidity environment. Whereas, when the difference in SP value is larger than the upper limit, the crystallinity of the polymer A becomes too high. For this reason, disproportionation between the polar part and the non-polar part is caused at the contact part between the carrier particle and the toner particle, resulting in slower rise-up of charging of the developer.

Incidentally, in the present invention, when a plurality of monomer units satisfying the requirements of the first monomer unit are present in the polymer A, the value of $SP_{11}$ in the formula (1) is assumed to be the weighted average value of respective SP values of respective monomer units. For example, the SP value ($SP_{11}$) when monomer units A with a SP value of $SP_{111}$ are included in an amount of A mol % based on the total number of moles of the monomer units satisfying the requirements of the first monomer unit, and monomer units B with a SP value of $SP_{112}$ are included in an amount of (100–A) mol % based on the total number of moles of the monomer units satisfying the requirements of the first monomer unit, is:

$$SP_{11} = (SP_{111} \times A + SP_{112} \times (100-A))/100$$

Also when three or more monomer units satisfying the requirements of the first monomer unit are included, calculation is similarly performed. On the other hand, $SP_{12}$ also similarly represents the average value obtained from calculation in terms of respective molar ratios of the first polymerizable monomers.

Further, in the present invention, to the second monomer unit, all the monomer units satisfying $SP_{21}$ satisfying the formula (1) for $SP_{11}$ calculated in the foregoing manner are applicable. Similarly, to the second polymerizable monomer, all the polymerizable monomers having $SP_{22}$ satisfying the formula (5) for $SP_{12}$ calculated in the foregoing manner are applicable.

Namely, when the second polymerizable monomers are two or more polymerizable monomers, $SP_{21}$ represents the SP value of the monomer unit derived from each polymerizable monomer, and $SP_{21}$–$SP_{11}$ is determined for the monomer unit derived from each second polymerizable monomer. Similarly, $SP_{22}$ represents the SP value of each polymerizable monomer, and $SP_{22}$–$SP_{12}$ is determined for each second polymerizable monomer.

The polymer A is preferably a vinyl polymer. Examples of the vinyl polymer may include a polymer of monomers including an ethylenically unsaturated bond. The ethylenically unsaturated bond denotes a carbon-carbon double bond capable of radical polymerization. Examples thereof may include a vinyl group, a propenyl group, an acryloyl group, and a methacryloyl group.

The magnetic carrier has a magnetic core, and a coating resin of the surface of the magnetic core, The coating resin includes a polymer B having a monomer unit (a) derived from a polymerizable monomer (a), and a monomer unit (b) derived from a polymerizable monomer (b) different from the polymerizable monomer (a), and assuming that an SP value of the monomer unit (a) is taken as SP(a) $(J/cm^3)^{0.5}$, and an SP value of the monomer unit (b) is taken as SP(b) $(J/cm^3)^{0.5}$, the following formulae (3) and (4):

$$20.30 \leq SP(a) \leq 22.00 \quad (3)$$

$$19.00 \leq SP(b) \leq 20.20 \quad (4)$$

are satisfied.

By satisfying the formulae (3) and (4), the monomer unit (a) interacts with the second monomer unit of the polymer A, and the monomer unit (b) interacts with the first monomer unit of the polymer A. This results in an improvement of the rise-up of charging, and an improvement of the charging maintaining property under high-temperature high-humidity environment.

When SP(a) is larger than 22.00 $(J/cm^3)^{0.5}$, the size of the block of the coating resin at the carrier particle surface is larger than the area of the contact part between the carrier particle surface and the toner particle surface. For this reason, the rise-up speed of charging is reduced. Similarly, when SP(b) is smaller than 19.00 $(J/cm^3)^{0.5}$, the size of the block of the coating resin at the carrier particle surface is larger than the area of the contact part between the carrier particle surface and the toner particle surface. For this reason, the rise-up speed of charging is reduced.

Whereas, when SP(a) is smaller than 20.30 $(J/cm^3)^{0.5}$, the polarity of the polar group is weakened. For this reason, respective interactions between the polar part present at the toner particle surface and the polar part present at the coating resin at the carrier particle surface, and between the non-polar part present at the toner particle surface and the non-polar part present at the coating resin at the carrier particle surface are not sufficiently expressed. Accordingly, the rise-up speed of charging of the developer is reduced.

Similarly, when SP(b) is larger than 20.20 $(J/cm^3)^{0.5}$, the non-polarity of the non-polar group is weakened. For this reason, respective interactions between the polar part present at the toner particle surface and the polar part present at the coating resin at the carrier particle surface, and between the non-polar part present at the toner particle surface and the non-polar part present at the coating resin at the carrier particle surface are not sufficiently expressed. Accordingly, the rise-up speed of charging of the developer is reduced.

SP(a) is preferably 20.30 $(J/cm^3)^{0.5}$ to 21.50 $(J/cm^3)^{0.5}$, and more preferably 20.30 $(J/cm^3)^{0.5}$ to 20.50 $(J/cm^3)^{0.5}$.

Whereas, SP(b) is preferably 19.50 $(J/cm^3)^{0.5}$ to 20.20 $(J/cm^3)^{0.5}$, and more preferably 20.00 $(J/cm^3)^{0.5}$ to 20.20 $(J/cm^3)^{0.5}$.

The binder resin is characterized by including a polymer A having a first monomer unit derived from a first polymerizable monomer of at least one selected from the group consisting of (meth)acrylic acid esters having a $C_{18-36}$ alkyl group.

The first monomer unit is (meth)acrylic acid ester having a $C_{18-36}$ alkyl group. As a result, the binder resin has crystallinity, which improves the low-temperature fixability.

When the number of carbons is smaller than 18, the crystallinity of the polymer A is remarkably reduced. Accordingly, the charging maintaining property under high-temperature high-humidity environment is reduced. Whereas, when the number of carbons is larger than 36, the crystallinity of the polymer A is too high. Accordingly, the rise-up speed of charging of the developer is reduced.

Further, the first aspect is characterized in that the content of the first monomer unit in the polymer A is 5.0 mol % to 60.0 mol % based on the total number of moles of all the monomer units in the polymer A.

Further, in the second aspect, the polymer A is a polymer of a composition including a first polymerizable monomer and a second polymerizable monomer different from the first polymerizable monomer. The content of the first polymerizable monomer in the composition is 5.0 mol % to 60.0 mol % based on the total number of moles of all the polymerizable monomers in the composition.

The content of the first polymerizable monomer or the first monomer unit falls within the foregoing range. This improves the low-temperature fixability, and the rise-up of charging under low-humidity environment, and the charging maintaining property under high-temperature high-humidity environment. When the content is less than 5.0 mol %, the low-temperature fixability is reduced, and additionally, the crystallinity is reduced, resulting in reduction of the charging maintaining property under high-temperature high-humidity environment.

On the other hand, when the content exceeds 60.0 mol %, the portion occupied by non-polar parts with a low SP value in the polymer A becomes larger, resulting in reduction of the rise-up speed of charging. The preferable range is 10.0 mol % to 60.0 mol %, and the more preferable range is 20.0 mol % to 40.0 mol %.

The first polymerizable monomer forming the first monomer unit is at least one selected from the group consisting of (meth)acrylic acid esters having a $C_{18-36}$ alkyl group.

Examples of (meth)acrylic acid ester having a $C_{18-36}$ alkyl group may include (meth)acrylic acid esters having a straight-chain alkyl group having 18 to 36 carbon atoms [such as stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, and dotriacontyl (meth)acrylate] and (meth)acrylic acid ester having a branched alkyl group having 18 to 36 carbon atoms [such as 2-decyltetradecyl (meth)acrylate].

Out of these, from the viewpoint of the charging maintaining property under high-temperature high-humidity environment and the rise-up speed of charging of a toner, preferable is at least one selected from the group consisting of (meth)acrylic acid esters having a straight-chain alkyl group having 18 to 36 carbon atoms, more preferable are at least one selected from the group consisting of (meth)acrylic acid esters having a straight-chain alkyl group having 18 to 30 carbon atoms, and further preferable is at least one selected from the group consisting of straight-chain stearyl (meth)acrylate and behenyl (meth)acrylate.

One first polymerizable monomer may be used alone, or two or more thereof may be used in combination.

Here, the SP value represents the abbreviation of the solubility parameter, and the value serving as an index of the solubility. The calculation method will be described later.

The unit of the SP value in the present invention is $(J/m^3)^{0.5}$, which can be converted into the unit of $(cal/cm^3)^{0.5}$ on the basis of the equation: 1 $(cal/cm^3)^{0.5} = 2.045 \times 10^3$ $(J/m^3)^{0.5}$.

The binder resin includes a polymer A. The polymer A has a first monomer unit derived from a first polymerizable monomer, and a second monomer unit derived from a second polymerizable monomer different from the first polymerizable monomer. The first polymerizable monomer is at least one selected from the group consisting of (meth)acrylic acid esters having a $C_{18-36}$ alkyl group. By having the first monomer unit, the polymer A becomes a resin showing crystallinity.

The first aspect is characterized in that the content of the second monomer unit in the polymer A is 20.0 mol % to 95.0 mol % based on the total number of moles of all the monomer units in the polymer A.

Further, in a second aspect, the polymer A is a polymer of a composition including a first polymerizable monomer, and a second polymerizable monomer different from the first polymerizable monomer. The content of the second polymerizable monomer in the composition is 20.0 mol % to 95.0 mol % based on the total number of moles of all the polymerizable monomers in the composition.

From the viewpoint of the rise-up of charging under low-humidity environment, the content is preferably 40.0 mol % to 95.0 mol %, and more preferably 40.0 mol % to 70.0 mol %.

As the second polymerizable monomers forming the second monomer unit, for example, out of the following ones, the polymerizable monomers satisfying the formulae (1) and (2) or the formulae (5) and (6) can be used. One second polymerizable monomer may be used alone, or two or more thereof may be used in combination.

Monomers having a nitrile group; for example, acrylonitrile and methacrylonitrile.

Monomers having a hydroxy group; for example, 2-hydroxyethyl (meth)acrylate and 2-hydroxypropyl (meth)acrylate.

Monomers having an amido group: for example, acrylamide, and monomers obtained by allowing $C_{1-30}$ amine, and $C_{2-30}$ carboxylic acid having ethylenically unsaturated bonds (such as acrylic acid and methacrylic acid) to react with each other by a known method.

Monomers having a urethane group: for example, monomers resulting from the reaction between $C_{2-22}$ alcohols having an ethylenically unsaturated bond (such as 2-hydroxyethyl methacrylate and vinyl alcohol) and $C_{1-30}$ isocyanates [monoisocyanate compounds (such as benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethyl hexyl isocyanate, dodecyl isocyanate, adamantyl isocyanate, 2,6-dimethyl phenyl isocyanate, 3,5-dimethyl phenyl isocyanate, and 2,6-dipropyl phenyl isocyanate), aliphatic diisocyanate compounds (such as trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2, 4, 4-trimethyl hexamethylene diisocyanate), alicyclic diisocyanate compounds (such as 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethyl xylylene diisocyanate), and aromatic diisocyanate compounds (such as phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate), and the like] by a known method, and Monomers resulting from the reaction between $C_{1-26}$ alcohols (such as methanol, ethanol, propanol, isopropyl alcohol, butanol, t-butyl alcohol, pentanol, heptanol, octanol, 2-ethyl hexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, eraidyl alcohol, oleyl alcohol, linoleyl alcohol, linolenyl alcohol, nonadecyl alcohol, heneicosanol alcohol, behenyl alcohol, and erucyl alcohol) and $C_{2-30}$ isocyanates having an ethylenically unsaturated bond [such as 2-isocyanato ethyl (meth)acrylate, 2-(0-[1'-methyl propylidene amino]carboxy amino)ethyl (meth)acrylate, 2-[(3,5-dimethylpyrazolyl)carbonyl amino]ethyl (meth)acrylate, and 1,1-(bis(meth)acryloyl oxy methyl)ethyl isocyanate] with a known method, and the like.

Monomers having a urea group: for example, monomers resulting from the reaction between $C_{3-22}$ amines [such as primary amines (such as normal butylamine, t-butylamine, propylamine, and isopropylamine), secondary amines (such as dinormal ethylamine, dinormal propylamine, and dinormal butylamine), aniline, and cycloxylamine], and $C_{2-30}$ isocyanates having an ethylenically unsaturated bond with a known method.

Monomers having a carboxy group: for example, methacrylic acid, acrylic acid, and 2-carboxyethyl (meth)acrylate.

Out of these, monomers having a nitrile group, an amido group, a urethane group, a hydroxy group, or a urea group are preferably used. More preferable are monomers having at least one functional group selected from the group consisting of a nitrile group, an amido group, a urethane group, a hydroxy group, and a urea group, and an ethylenically unsaturated bond. The monomers are preferably from the viewpoint of the electric charge maintaining property under high-temperature high-humidity environment. Out of these, a nitrile group is particularly preferable from the viewpoint of the low-temperature fixability.

As the second polymerizable monomers, vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, and vinyl octylate are also preferably used.

Vinyl esters are non-conjugated monomers, and tend to properly hold the reactivity with the first polymerizable monomer. For this reason, the crystallinity of the polymer A tends to be improved, and the low-temperature fixability and the charging maintaining property under high-temperature high-humidity environment become more likely to be combined.

The second polymerizable monomer preferably has an ethylenically unsaturated bond, and more preferably has one ethylenically unsaturated bond.

Further, the second polymerizable monomer is preferably at least one selected from the group consisting of the monomers expressed by the following formulae (A) and (B).

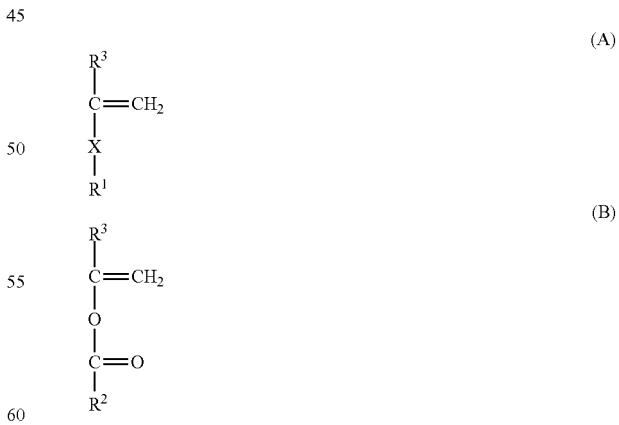

In the formula (A),
X represents a single bond or a $C_{1-6}$ alkylene group,
$R^1$ is
a nitrile group (—C≡N),
an amido group (—C(=O)NHR$^{10}$ (R$^{10}$ is a hydrogen atom, or a $C_{1-4}$ alkyl group)), a hydroxy group,
—COOR$^{11}$ (R$^{11}$ is a C$_{1-6}$ (preferably C$_{1-4}$) alkyl group, or a C$_{1-6}$ (preferably C$_{1-4}$) hydroxyalkyl group),
a urethane group (—NHCOOR$^{12}$ (R$^{12}$ is a C$_{1-4}$ alkyl group)),
a urea group (—NH—C(=O)—N(R$^{13}$)$_2$ (R$^{13}$s are each independently a hydrogen atom or a C$_{1-6}$ (preferably C$_{1-4}$) alkyl group)),
—COO(CH$_2$)$_2$NHCOOR$^{14}$ (R$^{14}$ is a C$_{1-4}$ alkyl group), or
—COO(CH$_2$)$_2$—NH—C(=O)—N(R$^{15}$)$_2$ (R$^{15}$s are each independently a hydrogen atom, or a C$_{1-6}$ (preferably C$_{1-4}$)alkyl group), and
R$^3$ is a hydrogen atom or a methyl group,
in formula (B),
R$^2$ is a C$_{1-4}$ alkyl group, and
R$^3$ is a hydrogen atom or a methyl group.
Preferably, in formula (A),
X represents a single bond or a C$_{1-6}$ alkylene group,
R$^1$ is
a nitrile group (—C≡N),
an amido group (—C(=O)NHR$^{10}$ (R$^{10}$ is a hydrogen atom, or a C$_{1-4}$ alkyl group)),
a hydroxy group,
—COOR$^{11}$ (R$^{11}$ is a C$_{1-6}$ (preferably C$_{1-4}$) alkyl group or a C$_{1-6}$ (preferably C$_{1-4}$) hydroxyalkyl group),
—COO(CH$_2$)$_2$NHCOOR$^{14}$ (R$^{14}$ is a C$_{1-4}$ alkyl group), or
—COO(CH$_2$)$_2$—NH—C(=O)—N(R$^{15}$)$_2$ (R$^{15}$s are each independently a hydrogen atom or a C$_{1-6}$ (preferably C$_{1-4}$) alkyl group), and
R$^3$ denotes a hydrogen atom or a methyl group,
in formula (B),
R$^2$ denotes an alkyl group with 1 to 4 carbon atoms, and
R$^3$ denotes a hydrogen atom or a methyl group.

The first aspect is characterized in that the polymer A has a second monomer unit derived from a second polymerizable monomer different from the first polymerizable monomer. The first aspect is characterized by satisfying the following formula (2). Preferably, the following formula (2)' is satisfied, and further preferably, the following formula (2)" is satisfied:

$$21.00 \leq SP_{21} \qquad (2)$$

$$21.00 \leq SP_{21} \leq 40.00 \qquad (2)'$$

$$25.00 \leq SP_{21} \leq 30.00 \qquad (2)''$$

wherein SP$_{21}$ represents the SP value of the second monomer unit.

Further, in the second aspect, the following formula (6) is satisfied. Preferably, the following formula (6)' is satisfied, and further preferably the following formula (6)" is satisfied.

$$18.30 \leq SP_{22} \qquad (6)$$

$$18.30 \leq SP_{22} \leq 30.00 \qquad (6)'$$

$$21.00 \leq SP_{22} \leq 23.00 \qquad (6)''$$

wherein SP$_{22}$ (J/cm$^3$)$^{0.5}$ represents the SP value of the second polymerizable monomer.

SP$_{21}$ and SP$_{22}$ fall within the respective ranges, which facilitates the movement of electric charges from the polar part of the coating resin at the carrier particle surface to the toner particle surface. For this reason, the rise-up speed of charging of the developer is improved.

The acid value Av of the polymer A is preferably 30.0 mgKOH/g or less, and more preferably 20.0 mgKOH/g or less. The lower limit has no particular restriction, and is preferably 0 mgKOH/g or more. When the acid value is 30.0 mgKOH/g or less, the crystallization of the polymer A is less likely to be inhibited. Accordingly, the melting point is favorably kept.

Further, for the polymer A, the weight-average molecular weight (Mw) of tetrahydrofuran (THF) soluble matter measured by gel permeation chromatography (GPC) is preferably from 10,000 to 200,000, and more preferably from 20,000 to 150,000. Mw falls within the foregoing range, which makes it easy to keep the elasticity at a temperature in the vicinity of room temperature.

Further, the melting point Tp of the polymer A is preferably from 50° C. to 80° C., and more preferably from 53° C. to 70° C. When the melting point is 50° C. or more, the charging maintaining property under high-temperature high-humidity environment becomes good. When the melting point is 80° C. or less, the low-temperature fixability becomes good.

The polymer A may include a monomer unit derived from a third polymerizable monomer not included in any range of the formula (1) or (5) (i.e., different from the first polymerizable monomer and the second polymerizable monomer) within the range not impairing the molar ratio of the first monomer unit derived from the first polymerizable monomer and the second monomer unit derived from the second polymerizable monomer.

As the third polymerizable monomers, monomers not satisfying the formula (1) or the formula (5) among the monomers explained as the second polymerizable monomer can be used.

Examples of the third polymerizable monomer may include styrene and derivatives thereof such as styrene and o-methyl styrene, and (meth)acrylic acid esters such as n-butyl (meth)acrylate, t-butyl (meth)acrylate, and 2-ethyl hexyl (meth)acrylate.

The third polymerizable monomer is preferably at least one selected from the group consisting of styrene, methyl methacrylate and methyl acrylate in order to improve the storability of the toner.

From the viewpoint of making it easy to obtain the effects of the present invention, the content of the polymer A is preferably 50 mass % or more based on the total mass of the binder resin. More preferable is 80 mass % to 100 mass %, and further preferably, the binder resin is the polymer A.

Further, the presence of the polymer A at the toner particle surface is preferable in that the effects of the present invention tend to be obtained.

The binder resin may be allowed to include a resin other than the polymer A, if required, for the purpose of improving the pigment dispersibility, or other purposes.

Examples of the resin other than the polymer A for use in the binder resin may include the following resins:

Homopolymers of styrene and substitution product thereof such as polystyrene, poly-p-chlorostyrene, and polyvinyl toluene; styrene type copolymers such as styrene-p-chlorostyrene copolymer, styrene-vinyl toluene copolymer, styrene-vinyl naphthalene copolymer, styrene-acrylic acid ester copolymer, styrene-methacrylic acid ester copolymer, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinyl butyral, terpene resin, cumarone-indene resin, and petroleum type resin.

Out of these, styrene type copolymer and polyester resin are preferable. Further, being amorphous is preferable.

The glass transition temperature of the coating resin of the magnetic carrier is preferably 40° C. to 100° C. from the viewpoints of the charging maintaining property under high-temperature high-humidity environment and the rise-up speed of charging. More preferable is 50° C. to 90° C.

In the polymer B, the content of the monomer unit (a) is preferably 10.0 mol % to 90.0 mol % based on the total number of moles of all the monomer units in the polymer B from the viewpoint of the ratio of the polar part and the non-polar part. More preferable is 30.0 mol % to 70.0 mol %.

For the same reason, the content of the monomer unit (b) is preferably 10.0 mol % to 90.0 mol %, and more preferably 30.0 mol % to 70.0 mol % based on the total number of moles of all the monomer units in the polymer B.

Further, examples of the polymerizable monomer (a) may include methyl methacrylate, methyl acrylate, and vinyl acetate. Preferable is at least one selected from the group consisting of alkyl esters of (meth)acrylic acid having a $C_{1-4}$ alkyl group. From the viewpoint of the rise-up speed of charging, methyl methacrylate is preferably contained therein. One or two or more of the monomers may be selected and used.

Further, examples of the polymerizable monomer (b) may include cyclohexyl methacrylate, cyclodecyl methacrylate, and butyl (meth)acrylate. Preferable is at least one selected from the group consisting of cycloalkyl esters of (meth) acrylic acid having a $C_{3-8}$ cycloalkyl group. From the viewpoint of the rise-up speed of charging, cyclohexyl methacrylate is more preferably included therein. One or two or more of the monomers may be selected and used.

Further, the content of the polymer B is preferably 50 mass % or more based on the total mass of the coating resin from the viewpoints of the rise-up speed of charging and the charging maintaining property under high-temperature high-humidity environment. More preferable is 70 mass % to 100 mass %.

Further, the following formula (9) is preferably satisfied:

$$0.20 \leq E/F \leq 7.00 \quad (9)$$

wherein E represents the ratio of the total number of moles of the second monomer units to the total number of moles of all the monomer units in the polymer A, and F represent the ratio of the total number of moles of the monomer unit (a) to the total number of moles of all the monomer units in the polymer B.

E/F is more preferably 0.40 to 3.50. E/F falling within the foregoing range results in a higher rise-up speed of charging.

Further, the magnetic core has no particular restriction, and for example, the following ones can be used.

Mention may be made of metal particles of surface-oxidized iron powder, unoxidized iron powder, iron, lithium, calcium, magnesium, nickel, copper, zinc, cobalt, manganese, chromium, rare-earth metals, and the like, alloy particles thereof, oxide particles thereof, magnetic bodies such as ferrite and magnetite, or magnetic body-dispersed resin carrier (so-called resin carrier) including a magnetic body and a binder resin holding the magnetic body in a dispersed state. Here, the carrier mixing proportion is set at preferably from 2 mass % to 15 mass %, and more preferably from 4 mass % to 13 mass % in terms of the toner density in a two-component developer. This usually provides good results.

Further, the time constant of charging of the two-component developer is preferably 10 seconds to 500 seconds, and more preferably 10 seconds to 400 seconds. When the time constant falls within the range, a change in density upon outputting images with different image printing ratio densities becomes less likely to occur. The time constant of charging can be controlled by the kind of the binder resin of the toner particle, the kind of the coating resin of the carrier particle, and the like. How the time constant of charging is determined will be described later.

Further, the magnetic core is a porous magnetic core.

The porous magnetic core is a resin-filled type magnetic core particle having a filler resin present in the void of the porous magnetic core.

In the pore diameter distribution of the porous magnetic core, the peak pore diameter resulting in the maximum differential pore volume within the range of from 0.1 μm to 3.0 μm is from 0.20 μm to 0.70 μm, the pore volume of the integration value of the differential pore volume within the range of from 0.1 μm to 3.0 μm is from 20 mm³/g to 57 mm³/g.

For the magnetic carrier, MR1 and MR2 preferably satisfy the relationship of:

$$0.20 \leq MR2/MR1 \leq 0.90$$

wherein MR1 represents JR1/FR1 and MR2 represents JR2/FR2 in which JR1 and JR2 represent respective ratios on a mass basis of the composition derived from the resin component, and FR1 and FR2 represent respective ratios on a mass basis of the composition derived from the porous magnetic core in the region R1 and the region R2 defined as follows.

Here, the definition of the region R1 will be described with reference to FIG. 1. In a cross sectional image of a magnetic carrier, two straight lines extending in parallel with the line segment passing through the center of gravity of the cross section of the carrier having a maximum length in the resin-filled type magnetic core particle, and being apart from the line segment by 2.5 μm are referred to as A and B. The followings are assumed: a straight line C passing through the point of intersection of the line segment and the contour line of the resin-filled type magnetic core particle and being orthogonal to the line segment, and a straight line D extending in parallel with the straight line C, being apart from the straight line C in the direction of center of the magnetic carrier by 5.0 μm.

The region surrounded by the contour line of the resin-filled type magnetic core particle between the straight lines A and B, and the straight lines A, B, and D, and in contact with the straight line C is taken as R1.

Further, the region R2 is the region surrounded by the straight lines A, B, and D, and a straight line E extending in parallel with the straight line D and being apart from the straight line D in the direction of center of the magnetic carrier by 5.0 μm.

This indicates that the resin proportion in the vicinity of the coating resin at the surface of the resin-filled type magnetic core particle is higher than the resin ratio of the inside. With this configuration, the rise-up speed of charging can be improved.

A feature resides in that the ratio (MR1) of the proportion of the composition derived from the resin in the vicinity of the surface layer of the resin-filled type magnetic core particle and the proportion of the composition derived from the porous magnetic core is larger than the ratio (MR2) of the proportion of the composition derived from the resin at the inner side part and the proportion of the composition derived from the porous magnetic core. In other words, it is indicated that the resin component at the surface layer is in a larger amount than that at the inner side part thereof.

When MR2/MR1 falls within the range of 0.20 to 0.90, respective interactions between the polar parts or between the non-polar parts of the toner particle surface and the carrier particle surface are appropriately caused, resulting in an improvement of the rise-up speed of charging of the developer.

Incidentally, MR2/MR1 can be controlled by the amount and the viscosity of the resin to be filled, and the like. Further, the control method will be also described in connection with the magnetic carrier manufacturing method described later. MR2/MR1 is preferably 0.25≤MR2/MR1≤0.85, and more preferably 0.30≤MR2/MR1≤0.75.

When the magnetic carrier is a magnetic carrier having a resin-filled type magnetic core particle including a resin in the void of the porous magnetic core, and a resin coat layer present at the surface of the resin-filled type magnetic core particle, the frequency of movement of electric charges from the carrier particle surface to the toner particle surface is increased, resulting in an improvement of the rise-up speed of charging of the developer.

The pore volume of the integration value of the differential pore volume within the range of from 0.1 µm to 3.0 µm in the pore diameter distribution of the porous magnetic core is preferably from 20.0 mm$^3$/g to 57.0 mm$^3$/g. When the pore volume is 20.0 mm$^3$/g or more, the micro deviation of the center of gravity increases the frequency of movement of electric charges from the carrier particle surface to the toner particle surface. This results in an improvement of the rise-up speed of charging of the developer. The pore volume is more preferably from 25.0 mm$^3$/g to 55.0 mm$^3$/g. The pore volume can be controlled by the baking temperature and the baking time of the porous magnetic core. For example, an increase in baking temperature can reduce the pore volume.

The peak pore diameter resulting in the maximum differential pore volume within the range of from 0.1 µm to 3.0 µm in the pore diameter distribution of the porous magnetic core is preferably from 0.20 µm to 0.70 µm. When the pore diameter falls within the foregoing range, respective interactions between the polar parts, or between the non-polar parts of the toner particle surface and the carrier particle surface are appropriately caused, resulting in an improvement of the rise-up speed of charging of the developer.

The peak pore diameter is preferably from 0.25 µm to 0.65 µm. The peak pore diameter can be controlled by the particle size of the finely pulverized pre-baked ferrite and the baking temperature and the baking time of the porous magnetic core. For example, by reducing the particle size of the finely pulverized pre-baked ferrite, it is possible to reduce the peak pore diameter.

Further, preferably, the magnetic core is a magnetic body-dispersed type resin carrier core material, the magnetic body-dispersed type resin carrier core material includes a magnetic particle A with a number average particle diameter of the primary particle of ra (µm), and a magnetic particle B with a number average particle diameter of the primary particle of rb (µm), the ra and rb satisfy the relationship of ra≥rb, the magnetic particle A includes an oxide of at least one nonferrous metal element selected from the group consisting of manganese element, aluminum element, magnesium element, titanium element, and nickel element, and iron oxide, the value (M1/F1) of ratio of M1 to F1 in which M1 (mass %) represents the total content of the nonferrous metal elements, and F1 (mass %) represents the content of the iron element in measurement by the fluorescent X-ray diffraction method of the magnetic carrier is from 0.010 to 0.100, and in measurement of the X-ray photoelectron spectroscopy of the magnetic carrier, the value (M2/F2) of the ratio of M2 to F2 in which the M2 (mass %) represents the total content of the nonferrous metal elements, and F2 (mass %) represents the content of the iron element is preferably from 1.0 to 10.0.

In measurement by the fluorescent X-ray diffraction method of the magnetic carrier, the value (M1/F1) of the ratio of M1 to F1 in which the M1 (mass %) represents the total content of the nonferrous metal elements, and F1 (mass %) represents the content of the iron element is preferably from 0.010 to 0.100, and more preferably from 0.020 to 0.090.

This indicates the proportions of other components than the iron oxide components present inside the magnetic body-dispersed type resin carrier core material. When M1/F1 falls within the foregoing range, the rise-up speed of charging of the developer is improved. M1/F1 can be controlled by the ratio of the magnetic particle A and the magnetic particle B. For example, an increase in ratio of the magnetic particle A can increase M1/F1.

In measurement by the X-ray photoelectron spectroscopy of the magnetic carrier, the value (M2/F2) of the ratio of M2 to F2 in which the M2 (mass %) represents the total content of the nonferrous metal elements, and F2 (mass %) represents the content of the iron element is preferably from 1.0 to 10.0, more preferably from 1.5 to 8.5, and further preferably from 1.8 to 6.0.

This indicates the ratio of other components than the iron oxide component present at the magnetic body-dispersed type resin carrier core material surface layer. When M2/F2 is 1.0 or more, the density of the image outputted after high-density output becomes more likely to be stabilized. On the other hand, when M2/F2 is 10.0 or less, the density of the image outputted after low-density output becomes more likely to be stabilized.

M2/F2 can be controlled by the coating amount of the nonferrous metal element of the magnetic particle A described later. For example, an increase in coating amount of the nonferrous metal element component of the magnetic particle A can increase M2/F2.

(M1/F1) and (M2/F2) falling within the respective ranges indicates that the nonferrous metal elements are unevenly distributed at the magnetic body-dispersed type resin carrier surface layer. This improves the rise-up speed of charging of the developer.

In measurement of M1 and M2, the nonferrous metal element is preferably at least one selected from the group consisting of manganese element, aluminum element, magnesium element, titanium element, and nickel element. By selecting the foregoing one as the nonferrous metal element component, it becomes easy to control the electric charge holding property and the charge relaxation property. As a result, conceivably, the electrostatic adhesion between the toner and the magnetic carrier, and the flowability of the developer are stabilized, so that the stirring property and the transportability of the developer are improved, and the charging maintaining property under high-temperature high-humidity environment is improved.

Coloring Agent

For the toner, a coloring agent may be used. As the coloring agents, the following ones may be mentioned as the examples thereof.

Examples of black coloring agents may include carbon black; and the one resulting from color matching to black using a yellow coloring agent, a magenta coloring agent, and a cyan coloring agent. For the coloring agent, a pigment may be used alone. However, use of a dye and a pigment in combination for improving the visibility is more preferable from the viewpoint of the image quality of the full-color image.

Examples of pigments for magenta toners may include: C.I. Pigment Reds, 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Reds 1, 2, 10, 13, 15, 23, 29, and 35.

Examples of dyes for magenta toners may include oil-soluble dyes such as C.I. Solvent Reds 1, 3, 8, 23, 24, 25, 27, 30, 49, 81, 82, 83, 84, 100, 109, and 121; C.I. Disperse Red 9; C.I. Solvent Violets 8, 13, 14, 21, and 27; and C.I. Disperse Violet 1, and basic dyes such as C.I. Basic Reds 1, 2, 9, 12, 13, 14, 15, 17, 18, 22, 23, 24, 27, 29, 32, 34, 35, 36, 37, 38, 39, and 40; and C.I. Basic Violets 1, 3, 7, 10, 14, 15, 21, 25, 26, 27, and 28.

Examples of pigments for cyan toners may include C.I. Pigment Blues 2, 3, 15:2, 15:3, 15:4, 16, and 17; C.I. Vat Blue 6; C.I. Acid Blue 45, and copper phthalocyanine pigment with 1 to 5 phthalimido methyl groups substituted in the phthalocyanine skeleton.

Dyes for cyan toner include C.I. Solvent Blue 70.

Examples of pigments for yellow tones may include C.I. Pigment Yellows 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellows 1, 3, and 20.

Examples of dyes for yellow toners may include C.I. Solvent Yellow 162.

The content of the coloring agent is preferably from 0.1 parts by mass to 30 parts by mass for every 100 parts by mass of the binder resin.

Wax

For the toner, wax may be used. Examples of the wax may include the following.

Hydrocarbon type waxes such as microcrystalline wax, paraffin wax, and Fischer-Tropsch wax; oxides of hydrocarbon type wax such as polyethylene oxide wax or block copolymers thereof; waxes including fatty acid ester as a main component such as Carnauba wax; and those resulting from deoxidation of a part or the whole of fatty acid esters such as deoxidized Carnauba wax.

Further, the following may be mentioned as examples of the wax: Saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohol, and melissyl alcohol; polyhydric alcohols such as sorbitol; esters of fatty acids such as palmitic acid, stearic acid, behenic acid, and montanic acid, and alcohols such as stearyl alcohol, aralkyl alcohol, behenyl alcohol, carnaubyl alcohol, ceryl alcohol, and melissyl alcohol; fatty acid amides such as linoleic acid amide, oleic acid amide, and lauric amide; saturated fatty acid bisamides such as methylene bis stearic acid amide, ethylene biscapric acid amide, ethylene bislauric acid amide, and hexamethylene bisstearic acid amide; unsaturated fatty acid amides such as ethylene bisoleic acid amide, hexamethylene bisoleic acid amide, N,N' dioleyl adipic acid amide, and N,N' dioleyl sebacic acid amide; aromatic type bisamides such as m-xylene bisstearic acid amide, and N,N' distearyl isophthalic acid amide; aliphatic metallic salts (those commonly referred to as metallic soap) such as calcium stearate, calcium laurate, zinc stearate, and magnesium stearate; waxes resulting from grafting of aliphatic hydrocarbon type wax using a vinyl type monomer such as styrene or acrylic acid; partially esterified product of fatty acid such as monoglyceride behenate and polyhydric alcohol; and methyl ester compound having a hydroxyl group obtained by hydrogenation of vegetable fats and oils.

The content of the wax is preferably 2.0 parts by mass to 30.0 parts by mass for every 100 parts by mass of the binder resin.

Charge Control Agent

The toner can be allowed to include a charge control agent, if required. As the charge control agents included in the toner, known ones can be used. Particularly, preferred is a metallic compound of aromatic carboxylic acid which is colorless, and has a high charging speed of the toner, and can hold a given charging amount with stability.

As the negative type charge control agents, mention may be made of salicylic acid metallic compound, naphthoic acid metallic compound, dicarboxylic acid metallic compound, polymer type compound having sulfonic acid or carboxylic acid at the side chain, polymer type compound having sulfonic acid salt or carboxylic acid salt at the side chain, polymer compound having carboxylic acid salt or carboxylic acid esterified product at the side chain, boron compound, urea compound, silicon compound, and calixarene. The charge control agent may be internally added or may be externally added to a toner particle.

The amount of the charge control agent to be added is preferably from 0.2 parts by mass to 10 parts by mass for every 100 parts by mass of the binder resin.

Inorganic Fine Particle

The toner may include an inorganic fine particle, if required.

The inorganic fine particle may be internally added to the toner particle, or may be mixed with the toner particle as an external additive. As the external additive, an inorganic fine particle such as silica is preferable.

The inorganic fine particle is preferably made hydrophobic by a hydrophobic agent such as a silane compound, silicone, or a mixture thereof.

As the external additive for improving the flowability, an inorganic fine particle with a specific surface are of from 50 $m^2/g$ to 400 $m^2/g$ is preferable, and for the durability test stability, an inorganic fine particle with a specific surface are of from 10 $m^2/g$ to 50 $m^2/g$ is preferable. For combination of flowability improvement and durability stability, inorganic fine particles with a specific surface area within the foregoing ranges may be used in combination.

Manufacturing Method

The method for manufacturing a toner particle has no particular restriction. Conventionally known manufacturing methods such as suspension polymerization method, emulsion aggregation method, melt kneading method, and dissolution suspension method can be adopted.

The resulting toner particle may be used as it is as a toner. To the toner particle, an inorganic fine particle, and, if required, other external additives may be mixed, resulting in a toner. For mixing of a toner particle and an external additive such as an inorganic fine particle, there can be used a mixing device such as double cone mixer, V type mixer, drum type mixer, super mixer, Henschel mixer, Nauta mixer, Mechano Hybrid (manufactured by NIPPON COKE & ENGINEERING CO., Ltd.), and Nobilta (manufactured by HOSOKAWA MICRON CORPORATION).

The external additive is preferably used in an amount of from 0.1 parts by mass to 10.0 parts by mass for every 100 parts by mass of the toner particle.

The measuring methods of various physical properties of the toner and the raw materials will be described below.

Analysis Method

Measuring Method of Contents of Monomer Units Derived from Various Polymerizable Monomers in Polymer A and Polymer B The measurement of contents of monomer units derived from various polymerizable monomers in the polymer A and the polymer B is performed by $^1$H-NMR under the following conditions.

Measuring device: FT NMR device JNM-EX400 (manufactured by JEOL Ltd.)
Measurement frequency: 400 MHz
Pulse condition: 5.0
Frequency range: 10,500 Hz
Cumulative number: 64
Measurement temperature: 30° C.
Sample: 50 mg of measurement sample is placed in a sample tube with an inner diameter of 5 mm, and deuteriochloroform (CDCl$_3$) is added as a solvent, and this is dissolved in a 40° C. thermostat for preparation.

From the resulting $^1$H-NMR chart, of the peaks belonging to the constituent elements of the monomer unit derived from the first polymerizable monomer, the peak independent of the peak belonging to the constituent elements of the monomer unit derived from others is selected, to calculate the integration value $S_1$ of the peak. Similarly, of the peaks belonging to the constituent elements of the monomer unit derived from the second polymerizable monomer, the peak independent of the peaks belonging to the constituent elements of the monomer unit derived from others is selected, to calculate the integration value $S_2$ of the peak.

Further, when a third polymerizable monomer is used, of the peaks belonging to the constituent elements of the monomer unit derived from the third polymerizable monomer, the peak independent of the peaks belonging to the constituent elements of the monomer unit derived from others is selected, to calculate the integration value $S_3$ of the peak.

The content of the monomer units derived from the first polymerizable monomer is determined using the integration values $S_1$, $S_2$, and $S_3$ in the following manner. Incidentally, $n_1$, $n_2$, and $n_3$ are each the number of hydrogens in the constituent elements to which the peak that has come into focus for each segment belongs.

Content (mol %) of monomer units derived from first polymerizable monomer=$\{(S_1/n_1)/((S_1/n_1)+(S_2/n_2)+(S_3/n_3))\}\times100$ Similarly, the proportions of the monomer units derived from the second polymerizable monomer and the third polymerizable monomer are determined in the following manner.

Content (mol %) of monomer units derived from second polymerizable monomer=$\{(S_2/n_2)/((S_1/n_1)+(S_2/n_2)+(S_3/n_3))\}\times100$ Content (mol %) of monomer units derived from third polymerizable monomer=$\{(S_3/n_3)/((S_1/n_1)+(S_2/n_2)+(S_3/n_3))\}\times100$ Incidentally, when a polymerizable monomer not including a hydrogen atom in the constituent element other than a vinyl group is used in the polymer A, measurement is performed with the measurement atomic nucleus as $^{13}$C using $^{13}$C-NMR in a single pulse mode, so that calculation is performed in the same manner by $^1$H-NMR.

Whereas, when the toner is manufactured by a suspension polymerization method, peaks of a release agent and other resins may overlap to prevent independent peaks from being observed. This may result in the case where the content of each monomer unit derived from various polymerizable monomers in the polymer A cannot be calculated. In that case, by performing suspension polymerization without using a release agent and other resins, a polymer A' is manufactured. Thus, analysis can be performed by regarding the polymer A' as the polymer A.

Also for the polymer B, calculation can be performed in the same manner as with the polymer A.

Measuring Method of Glass Transition Temperature and Melting Point of Polymer A and Coating Resin The glass transition temperature and the melt peak temperature are measured using a differential scanning colorimetry device "Q2000" (TA Instruments Co.) according to ASTM D3418-82.

For the temperature correction of the device detection part, the melting points of indium and zinc are used, and for correction of the amount of heat, the heat of fusion of indium is used.

Specifically, about 3 mg of a sample is accurately weighed, and is placed in a pan made of aluminum. An empty pan made of aluminum is used as a reference. Thus, measurements are performed under the following conditions.

Ramp rate: 10° C./min
Measurement start temperature: 30° C.
Measurement termination temperature: 180° C.

Measurement is performed within the measurement range of between 30 and 180° C. at a ramp rate of 10° C./min. Once, the temperature is increased up to 180° C., and is held for 10 minutes. Subsequently, the temperature is decreased down to 30° C. Then, the temperature is increased again. In the second temperature rising process, a change in specific heat is obtained at a temperature within the range of 30° C. to 100° C. The point of intersection between the line of the intermediate points of the base lines before occurrence and after occurrence of the change in specific heat and the differential thermal curve is referred to as the glass transition temperature (Tg) of the binder resin.

Further, the temperature resulting in the maximum endothermic peak of the temperature-endothermic quantity curve within the temperature range of 60° C. to 90° C. is referred to as the melt peak temperature (Tp) of the melting point of the polymer.

Separation of Polymer and Binder Resin from Toner

After separating the polymer and the binder resin from the toner using the difference in solubility in solvent, DSC measurement can be performed.

Calculation Method of SP Value $SP_{12}$, $SP_{22}$, SP(a), and SP(b) are determined according to the calculation method proposed by Fedors in the following manner.

For respective polymerizable monomers, the evaporation energy ($\Delta ei$) (cal/mol) and the molar volume ($\Delta vi$) (cm$^3$/mol) are determined from the table described in "polym. Eng. Sci., 14(2), 147-154 (1974)" for the atom or the atomic group in the molecular structure, and $(4.184\times\Sigma\Delta ei/\Sigma\Delta vi)^{0.5}$ is referred to as SP value (J/cm$^3$)$^{0.5}$.

Incidentally, $SP_{11}$ and $SP_{21}$ are calculated for the atom or the atomic group of the molecular structure in which the double of the polymerizable monomer is cleaved by polymerization in the same manner as described above.

Measurement of Molecular Weight of THF Soluble Matter of Resin of Toner Particle The molecular weight (Mw) of the THF soluble matter of the polymer A is measured by gel permeation chromatography (GPC) in the following manner.

First, a sample is dissolved in tetrahydrofuran (THF) at room temperature over 24 hours. Then, the resulting solution is filtrated through a solvent resistant membrane filter "Mishoridisk" with a pore diameter of 0.2 μm (manufactured by TOSOH CORPORATION Ltd.), resulting in a sample solution. Incidentally, the sample solution is adjusted so that the concentration of the component soluble in THF becomes about 0.8 mass %. Using the sample solution, measurement is performed under the following conditions.

Device: HLC8120 GPC (detector: RI) (manufactured by TOSOH CORPORATION Ltd.)

Column: 7 series of Shodex KF-801, 802, 803, 804, 805, 806, and 807 (manufactured by SHOWA DENKO K.K.)

Eluant: tetrahydrofuran (THF)

Flow rate: 1.0 ml/min

Oven temperature: 40.0° C.

Sample injection amount: 0.10 ml

For calculation of the molecular weight of the sample, the molecular weight calibration curve formed using standard polystyrene resin (e.g., trade name "TSK standard polystyrene F-850, F-450, F-288, F-128, F-80, F-40, F-20, F-10, F-4, F-2, F-1, A-5000, A-2500, A-1000, and A-500", manufactured by TOSOH CORPORATION Ltd.) is used.

Measuring Method of Acid Value

An acid value A vis the number of milligrams of potassium hydroxide necessary for neutralizing the acid included in 1 g of the sample. The acid value of the polymer A in the present invention is measured according to JIS K 0070-1992. Specifically, measurement is performed according to the following procedure.

(1) Preparation of Reagent

Phenolphthalein is dissolved in an amount of 1.0 g in 90 mL of ethyl alcohol (95 vol %). Ion exchanged water is added thereto to make 100 mL, resulting in a phenolphthalein solution.

Special grade potassium hydroxide is dissolved in an amount of 7 g in 5 mL of water. Ethyl alcohol (95 vol %) is added thereto to make 1 L. The resulting solution is placed in an alkali resistant container so as not to be in contact with a carbonic acid gas or the like, and is allowed to stand still for 3 days, followed by filtration, resulting in a potassium hydroxide solution. The resulting potassium hydroxide solution is stored in an alkali resistant container. The factor of the potassium hydroxide solution is determined from the amount of the potassium hydroxide solution required for neutralization in the following procedure: 25 mL of 0.1 mol/L hydrochloric acid is taken in an Erlenmeyer flask, and several drops of the phenolphthalein solution is added thereto; thus, titration is performed with the potassium hydroxide solution. For the 0.1 mol/L hydrochloric acid, the one formed according to JIS K 8001-1998 is used.

(2) Operation (A) Main Test 2.0 g of a pulverized polymer A sample is accurately weighed in a 200-ml Erlenmeyer flask, and 100 ml of a mixed solution of toluene/ethanol (2:1) is added thereto. The mixture is dissolved over 5 hours. Then, as an indicator, several drops of the phenolphthalein solution is added thereto. Thus, titration is performed using the potassium hydroxide solution. Incidentally, the end point of titration is assumed to be the time at which the light red color of the indicator has lasted for about 30 seconds.

(B) Blank Test

The same titration as the operation is performed, except that the sample is not used (i.e., only mixed solution of toluene/ethanol (2:1) is used).

(3) The resulting results are substituted into the following equation, thereby calculating the acid value.

$$A=[(C-B)\times f\times 5.61]/S$$

wherein A: the acid value (mgKOH/g), B: the addition amount (mL) of a potassium hydroxide solution of the blank test, C: the addition amount (mL) of the potassium hydroxide solution in the main test, f: factor of the potassium hydroxide solution, and S: mass (g) of the sample.

Weight-Average Particle Diameter (D4) of Toner Particle

The weight-average particle diameter (D4) of the toner particle is measured by a number of effective measurement channel of 25,000 channels using a precision particle size distribution measuring device "Coulter counter Multisite 3" (registered trade name, manufactured by Beckman Coulter Inc.) including a 100-μm aperture tube by a pore electrical resistance method, and the accompanying dedicated software "Beckman Coulter Multisizer 3 Version 3.51" (manufactured by Beckman Coulter Inc.) for setting the measurement conditions and analyzing the measurement data. The measurement data is analyzed for calculation.

As the aqueous electrolytic solution for use in the measurement, the one obtained by dissolving special grade sodium chloride in ion exchanged water to a concentration of about 1 mass % such as "ISOTON II" (manufactured by Beckman Coulter Inc.) can be used.

Incidentally, before performing measurement and analysis, the dedicated software is set in the following manner.

In the "change screen of standard measuring method (SOM)" of the dedicated software, the total count number in a control mode is set to be 50,000 particles, the number of times of measurement is set to be 1, and a value obtained by using "standard particle 10.0 μm" (manufactured by Beckman Coulter, Inc) is set as a Kd value. The threshold and the noise level are automatically set by pressing a "threshold/noise level measurement button". Further, a current is set to 1,600 μA, a gain is set to 2, and an electrolyte solution is set to be ISOTON II, and a check mark is placed in flushing of the aperture tube after the measurement.

In the "setting screen for conversion from pulse to particle diameter" of the dedicated software, the bin interval is set to a logarithmic particle diameter, the number of particle diameter bins is set to 256, and the particle diameter range is set to from 2 μm to 60 μm.

Specific measuring method is as follows.

(1) About 200 ml of the aqueous electrolytic solution is charged into a 250-ml round-bottom beaker made of glass, dedicated for the Multisizer 3. The beaker is set in a sample stand, and the solution is stirred with a stirrer rod at 24 rotations/sec in a counterclockwise direction. Then, dirt and bubbles in the aperture tube are removed by the "aperture tube flushing" function of the dedicated software.

(2) About 30 ml of the aqueous electrolytic solution is charged into a 100-ml flat-bottom beaker made of glass. About 0.3 ml of a diluted solution prepared by diluting about three-mass-fold "Contaminon N" (a 10 mass % aqueous solution of a neutral detergent for washing a precision measuring instrument, including a nonionic surfactant, an anionic surfactant and an organic builder and having a pH of 7, manufactured by Wako Pure Chemical Industries, Ltd.) with ion exchange water is added therein as a dispersant.

(3) A predetermined amount of ion-exchanged water is charged into the water tank of an ultrasonic dispersing unit "Ultrasonic Dispersion System Tetora 150" (manufactured by Nikkaki Bios Co., Ltd.) internally including two oscillators each having an oscillatory frequency of 50 kHz with the phase shifted by 180° and having an electrical output of 120 W. About 2 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted so as to maximize the resonance state of the liquid level of the aqueous electrolytic solution in the beaker.

(5) About 10 mg of the toner is gradually added to and dispersed in the aqueous electrolytic solution in the beaker in the section (4) with the aqueous electrolytic solution irradiated with an ultrasonic wave. Then, the ultrasonic dispersion treatment is continued for additional 60 seconds. Incidentally, the temperature of water in the water tank is appropriately adjusted so as to be from 10° C. to 40° C. for ultrasonic dispersion.

(6) The aqueous electrolytic solution in the section (5) including the toner dispersed therein is added dropwise with a pipette to the round-bottom beaker in the section (1) placed in the sample stand, and the resulting mixture is adjusted to a measurement concentration of about 5%. Then, measurement is performed until the number of particles measured becomes 50,000.

(7) The measurement data is analyzed with the dedicated software included with the device, and the weight-average particle diameter (D4) is calculated. Incidentally, the "average diameter" on the analysis/volume statistic (arithmetic average) screen when the dedicated software is set to show data in graph/vol % is the weight-average particle diameter (D4).

Measurement of Pore Diameter and Pore Volume of Porous Magnetic Core

The pore diameter distribution of the porous magnetic core is measured with the mercury indentation method.

The measurement principle is as follows.

In the present measurement, the pressure applied on mercury is changed. The amount of mercury penetrated into the pore at that step is measured. The condition under which mercury can penetrate into the pore can be expressed as $PD = -4\sigma \cos \theta$ from the balance of forces, where P represents the pressure; D, the pore diameter; $\theta$, the contact angle of mercury; and $\sigma$, the surface tension. When the contact angle and the surface tension are each a constant, the pressure P and the pore diameter D capable of allowing mercury to penetrate at that time are inversely proportional to each other. For this reason, the pore distribution is determined by substituting the pore diameter for the lateral axis P of the P-V curve resulting from the measurement by changing the pressure in which P represents the pressure and V represents the penetration liquid amount.

Using Autopore IV9520 of SHIMAZU Corporation as the measuring device, measurement is performed under the following conditions/procedures.

| Measurement Conditions | |
| --- | --- |
| Measurement environment | 20° C. |
| Measurement cell | Sample volume 5 cm$^3$, Indentation volume 1.1 cm$^3$, Use for powder |
| Measurement range | From 2.0 psia (13.8 kPa) to 59,989.6 psia (413.7 MPa) |
| Measurement step (steps are made so as to ensure equidistance when the pore diameter is taken in logarithm) | 80 steps |
| Indentation parameter exhaust pressure | 50 μmHg |
| exhaust time | 5.0 min |
| mercury injection pressure | 2.0 psia (13.8 kPa) |
| equilibrium time | 5 secs |
| High pressure parameter equilibrium time | 5 secs |
| Mercury parameter advancing contact angle | 130.0 degrees |
| receding contact angle | 130.0 degrees |
| surface tension | 485.0 mN/m (485.0 dynes/cm) |
| mercury density | 13.5335 g/mL |

Measurement Procedure (1) About 1.0 g of the porous magnetic core is weighed, and is placed in a sample cell.

The weighed value is inputted.

(2) At the low pressure part, the measurement is performed within the range of from 2.0 psia (13.8 kPa) to 45.8 psia (315.6 kPa).

(3) At the high pressure part, the measurement is performed within the range of from 45.9 psia (316.3 kPa) to 59,989.6 psia (413.6 MPa).

(4) The pore diameter distribution is calculated from the mercury injection pressure and the mercury injection amount.

(2), (3), and (4) are automatically performed with the software attached to the device.

From the pore diameter distribution measured as described above, the peak pore diameter resulting in the maximum differential pore volume with the pore diameter within the range of from 0.1 μm to 3.0 μm is read.

Further, the differential pore volume with the pore diameter within the range of from 0.1 μm to 3.0 μm is calculated using the dedicated software, and is referred to as the pore volume.

Separation of Resin Coat Layer from Magnetic Carrier and Fractionation of Coating Resin (Polymer B) in Resin Coat Layer As the method for separating the coating resin from the magnetic carrier, there is the following method: a magnetic carrier is taken in a cup, and the coating resin is eluted using toluene.

The eluted resin is fractionated using the following devices.

Device Configuration
LC-908 (manufactured by Japan Analytical Industry Co., Ltd.)
JRS-86 (the same company; Repeat injector)
JAR-2 (the same company; Autosampler)
FC-201 (GILSON Co.; Fraction collector)
Column Configuration
JAIGEL-1H to 5H (20Φ×600 mm: preparative column) (manufactured by Japan
Analytical Industry Co., Ltd.)
Measurement Conditions
Temperature: 40° C.
Solvent: THF
Flow rate: 5 ml/min.
Detector: RI Using the resin configuration identified in the following manner based on the molecular weight distribution of the coating resin, the elution time resulting in the peak molecular weight (Mp) of each kind of the coating resins (the polymer B and, if required, other resins) is previously measured. Before and after that, respective resin components are fractionated. Subsequently, the solvent is removed and drying is performed, resulting in a coating resin for every kind.

Incidentally, for the resin configuration, using a Fourier transform infrared spectrophotometer (Spectrum One: manufactured by PerkinElmer Co.), the atomic group is identified from the absorption wave number, and is identified for every resin included in the coating resin.

Measurement of MR1 and MR2 of Magnetic Carrier Cross Section

1. Cutting of Cross Section

For processing the cross section of the magnetic carrier, focused ion beam processing observation device (FIB), FB-2100 (manufactured by Hitachi High-Technologies Corporation) is used. On a sample stand for FIB (metal mesh), carbon paste is applied. A magnetic carrier is fixed thereon in a small amount so as to be present independently one particle by one particle, and platinum is vapor deposited as a conductive film, thereby manufacturing a sample. The sample is set in the FIB device, and is roughly processed using a Ga ion source at an accelerating voltage of 40 kV, (beam current 39 nA), followed by finishing processing (beam current 7 nA), thereby cutting out the carrier cross section.

Incidentally, as the magnetic carrier cross section to be selected as a measurement sample, applicable is the magnetic carrier satisfying $D50 \times 0.9 \leq H \leq D50 \times 1.1$ where H represents the length of the line segment of the maximum length of the carrier particle cross section. On hundred cross section samples falling within this range are prepared.

2. Analysis of Components Derived from Porous Magnetic Core and Resin Component of Magnetic Carrier Using a scanning electron microscope (S4700 manufactured by HITACH Ltd), the elements of the magnetic component and the resin component of the magnetic carrier cross section sample are analyzed using an element analysis means (energy dispersion type X ray analysis device manufactured by EDAX Co.) attached to the scanning electron microscope.

By setting the observation magnification at 10,000 times or more, the region only consisting of the magnetic components is observed at an accelerating voltage of 20 kV, and a capture time of 100 sec, thereby identifying the elements in the components derived from the porous magnetic core. The elements in the resin component are also identified in the same manner.

The components derived from the porous magnetic core are the elements identified in the foregoing description. Oxygen is included in both of the components derived from the porous magnetic core and the resin components, and the content thereof is difficult to identify, and hence oxygen is excluded from the components derived from the porous magnetic core. In other words, the components derived from the porous magnetic core in the present invention are assumed to be metallic elements in ferrite forming the porous magnetic core.

The resin components are the elements identified in the foregoing description. Oxygen is included in both of the magnetic components and the resin components, and the content thereof is difficult to identify, and hence oxygen is excluded from the resin components. Further, with the energy dispersion type X ray analysis device used in the present invention, hydrogen cannot be identified, and hence hydrogen is also excluded from the resin components. In other words, in the present invention, when acrylic resin including carbon, hydrogen, and oxygen is used, the element serving as the resin component is assumed to be only carbon. Whereas, in the case of a silicone resin, the elements are assumed to be carbon and silicon.

3. Measurement of Metal Component Content and Resin Content of Cross Section

Using a scanning electron microscope, the magnetic carrier cross section is enlarged to 2000 times to be observed.

At the resulting cross sectional image, two straight lines in parallel with the line segment passing through the center of gravity of the cross section of the magnetic carrier, and of the maximum length of the resin-filled type magnetic core particle, and separated from the line segment by 2.5 µm are referred to as A and B. Suppose a straight line C passing through the point of intersection between the line segment and the contour line of the resin-filled type magnetic core particle, and orthogonal to the line segment, and a straight line D in parallel with the straight line C, separated from the straight line C in the direction of center of the magnetic carrier by 5.0 µm.

The region surrounded by the contour line of the resin-filled type magnetic core particle between the straight lines A and B, and the straight lines A, B, and D, and in contact with the straight line C is referred to as R1.

By thus dividing the region, the measurement can be performed under the conditions obtained by minimizing the effects of the coating resin components.

Further, the region surrounded by the straight lines A, B, and D, and a straight line E in parallel with the straight line D, and separated from the straight line D in the direction of center of the magnetic carrier by 5.0 µm is referred to as R2.

For each of the regions R1 and R2, the mass ratio (mass %) of the element is measured at an accelerating voltage of 20 kV, and with a capture time of 100 sec using an element analysis means.

For example, in the case of the magnetic carrier in which the component of the magnetic core particle is a Mn—Mg—Sr type ferrite, and which is filled with a silicone resin, and coated with an acryl type resin, the elements of the metallic component are iron, manganese, magnesium, and strontium, and the elements of the resin component are carbon and silicon. The total mass ratio of the mass ratios (mass %) of elements of carbon and silicon of the R1 region at this step is JR1. The total mass ratio of the mass ratios (mass %) of elements of iron, manganese, magnesium, and strontium is FR1. Further, the total mass ratio of the mass ratios (mass %) of elements of carbon and silicon of the R2 region is JR2. The total mass ratio of the mass ratios (mass %) of elements of iron, manganese, magnesium, and strontium is FR2.

Measurement of Amount of Coating Resin of Magnetic Carrier

For example, when the filler resin is not dissolved in toluene, a thermoplastic resin is used as the coating resin, the amount of the coating resin can be measured from the magnetic carrier in the following manner.

A A 100-ml beaker is accurately weighed (measured value 1). Then, about 5 g of a sample to be measured is placed therein, and the total mass of the sample and the beaker is accurately weighed (measured value 2).

B About 50 ml of toluene is placed in the beaker, and is oscillated by an ultrasonic oscillator for 5 minutes.

C After completion of oscillation, the sample in the beaker is allowed to stand still for several minutes, is stirred by causing a neodymium magnet to trace the bottom of the beaker 20 times. Then, only the toluene solution including the coating resin dissolved therein is poured as liquid waste.
D With the sample in the beaker still held by the neodymium magnet externally, about 50 ml of toluene is placed in the beaker again, and the operations B and C are repeated 10 times.
E By changing the solvent to chloroform, the operations B and C are performed another time.
F The sample is charged together with the beaker into a vacuum dryer, and the solvent is dried and removed (as the vacuum dryer, the one equipped with a solvent trap is used, and vacuum drying is carried out at a temperature of 50° C., and a degree of vacuum of −0.093 MPa or less, and for a drying time of 12 hours).
G The beaker is taken out from the vacuum dryer, and is allowed to stand still for about 20 minutes for cooling. Then, the mass is accurately weighed (measured value 3).
H From the measured value obtained in the manner described up to this point, the coating resin amount (mass %) is calculated according to the following equation.

Coating resin amount=(Initial sample mass−sample mass after dissolving coating resin)/sample mass×100

In the equation, the sample mass can be determined from calculation of (measured value 2−measured value 1), and the sample mass after dissolving coating resin can be determined from calculation of (measured value 3−measured value 1).

Measuring Method of Number Average Particle Diameter of Magnetic Body

Respective number average particle diameters of the magnetic particle A and the magnetic particle B in the magnetic body-dispersed type resin carrier core material are measured in the following procedure.

The cross section of the magnetic body-dispersed type resin carrier core material cut by a microtome or the like is observed by a scanning electron microscope (50,000 times), thereby extracting 100 particles with a particle diameter of 50 nm or more at random. The particle diameter of the major axis of each extracted particle is calculated from the image, and the average value of the particle diameters of 100 particles is referred to as the number average particle diameter.

Incidentally, when manganese element, aluminum element, magnesium element, titanium element, or nickel element is not used for the magnetic particle B, in the cross section, the magnetic particles A and B can be distinguished in the following manner.

Using a scanning electron microscope (S4700 (trade name) manufactured by HITACH Ltd.), the elements of the magnetic component and the resin component of the cross section of the magnetic body-dispersed type resin carrier core material are analyzed using the element analysis means (energy dispersion type X ray analysis device, manufactured by EDAX Co.) attached to the scanning electron microscope.

While adjusting the magnification, one magnetic particle is subjected to element analysis. Thus, the particle from which an iron element, and other than the iron element, manganese element, aluminum element, magnesium element, titanium element, or nickel element have been detected is defined as the magnetic particle A. The particle having only an iron element, or an iron element, and other elements than manganese element, aluminum element, magnesium element, titanium element, and nickel element is defined as the magnetic particle B. The one from which an iron element has not been detected is defined as a non-magnetic particle.

Measuring Method of F1 and M1 with Fluorescent X-Ray Diffraction Method

For the measurement of F1 and M1 of the magnetic carrier, measurement is performed using the sample before resin coating. Alternatively, there can be used the one obtained by dissolving the resin coat layer of the magnetic carrier after coating with chloroform, followed by drying.

Using a wavelength-dispersive fluorescence X ray analysis device Axios advanced (manufactured by Spectris Co., Ltd.), under a He atmosphere, the elements of from Na to U in the magnetic body-dispersed type resin carrier core material are directly measured. Incidentally, in the magnetic body-dispersed type resin carrier core material, the resin components are also present. However, the element detected by the fluorescence X ray analysis is a metal. For this reason, substantially, the ratios of F1 and M1 in the magnetic carrier are determined.

For the sample, using a cup for liquid sample attached to the device, a PP (polypropylene) film is bonded to the bottom surface, and the sample is placed therein in a sufficient amount (10 g). Thus, a layer is formed with a uniform thickness at the bottom surface, and a lid is placed thereon. Under the condition of an output of 2.4 kW, measurement is performed.

For the analysis, the FP (fundamental parameter) method is used. At that step, all the elements detected are assumed to be oxides, and the total mass thereof is assumed to be 100 mass %. With software UniQuant5 (ver. 5.49) (manufactured by Spectris Co., Ltd.), the contents (mass %) of F1 and M1 based on the total mass is determined as an oxide equivalent value.

Measuring Method of F2 and M2 by XPS

A magnetic carrier is pasted on indium foil. At this step, particles are uniformly pasted so as to prevent the indium foil part from being exposed. The measurement conditions of XPS analysis are as follows.
Device: PHI5000VERSAPROBE II (manufactured by ULVAC-PHI, Inc.)
Radiation ray: Al and Kd rays
Output: 25 W 15 kV
Pass Energy: 29.35 eV
Stepsize: 0.125 eV
XPS peaks: $Ti_{2P}$, $Al_{2P}$, $Mg_{2P}$, $Mn_{2P}$, $Ni_{2P}$, and $Fe_{2P}$ F2 and M2 each represent the value obtained by converting element % into mass % calculated from each peak.

Time Constant of Charging of Developer

The time constant of charging of a developer is calculated in the following manner.

First, 90 g of a prescribed magnetic carrier and 10 g of a toner are placed in a plastic bottle with a lid, and shaken at a speed of 4 reciprocations per second for a prescribed time by a vibration shaker (YS-LD manufactured by YAYOI Co., Ltd), thereby charging a developer including a toner and a carrier. Here, the prescribed time is 60 seconds, 120 seconds, 300 seconds, 600 seconds, 1200 seconds, 1800 seconds, or 2400 seconds.

Figure 2:
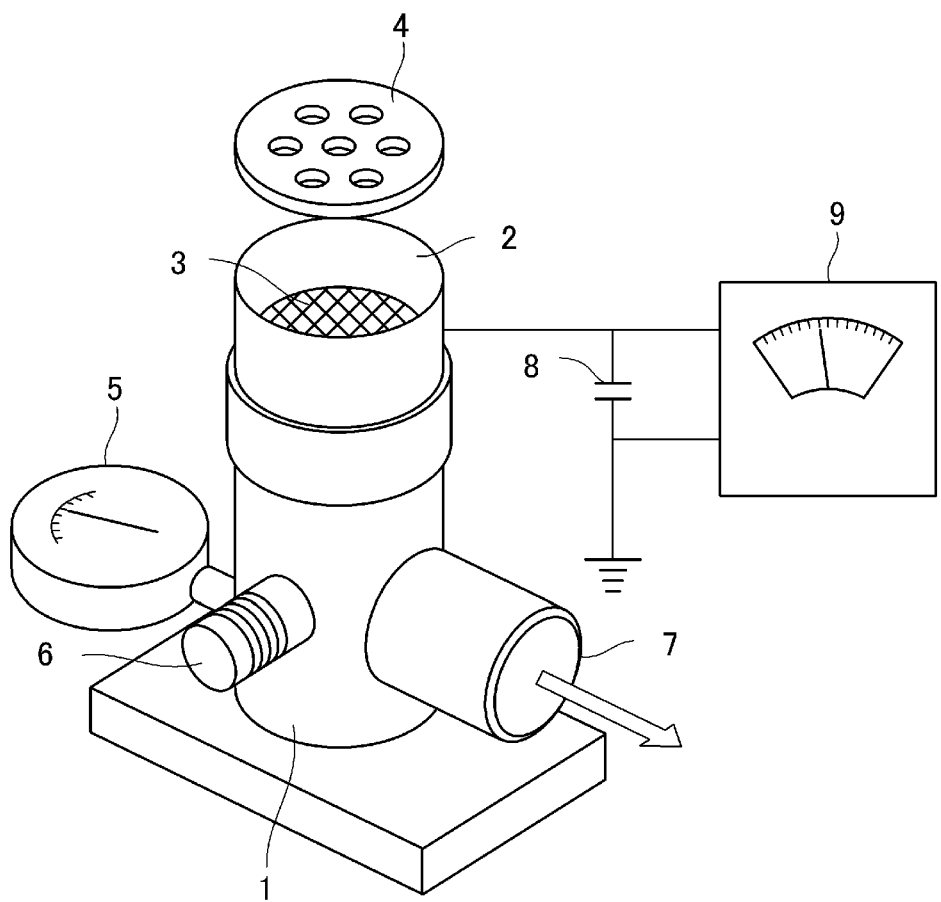
FIG. 2 is a schematic drawing of a triboelectric charging amount measuring device.

Then, with a device for measuring the triboelectric charging amount shown in FIG. 2, the triboelectric charging amount is measured. In a measurement container 2 made of a metal equipped with a 500-mesh screen 3 at the bottom, about 0.5 to 1.5 g of the developer is placed, and a lid 4 made of a metal is put thereon. The mass of the whole measurement container at this step is weighed, and referred to as W1 (g). Then, in an aspirator 1 (whose portion in contact with the measurement container 2 is at least insulator), suction is performed from a suction port 7, and an air quantity control valve 6 is adjusted, thereby setting the pressure of a vacuum gauge 5 at 250 mmAq. In this state, suction is performed for 2 minutes, so that the toner is removed by suction. The electric potential of an electrometer 9 at this step is referred to as V (volt). Here, the capacitance of a capacitor 8 is referred to as C (mF). Further, the mass of the whole measurement container after suction is weighed, and is taken as W2 (g). The triboelectric charging amount (mC/kg) of this sample is calculated from the following equation.

Triboelectric charging amount of sample $q(t)=$(mC/kg)$=C \times V/(W1-W2)$

When the change in electric charge amount of the developer is approximated from the resulting results as $q(t)=A \cdot \{1-\exp(-t/tg)\}$, the value of tg is calculated as the time constant of charging. (A: constant, t: shaking time)

EXAMPLES

Below, the present invention will be described more specifically by reference to examples. The present invention is not limited to only the examples. In the following formulation, unless otherwise specified, part is on a mass basis.

Manufacturing Example of Polymer 1

| | |
|---|---|
| Solvent: toluene | 100.0 parts |
| Monomer composition | 100.0 parts |
| (the monomer composition is assumed to be a mixture including the following behenyl acrylate/methacrylonitrile/styrene in the ratios shown below) | |
| behenyl acrylate (first monomer) | 67.0 parts (28.9 mol %) |
| methacrylonitrile (second monomer) | 22.0 parts (53.8 mol %) |
| styrene (third monomer) | 11.0 parts (17.3 mol %), and |
| Polymerization initiator t-butylperoxy pivalate (perbutyl PV manufactured by NOF Corporation) | 0.5 part |

The materials were charged into a reactor vessel equipped with a reflux condenser, a stirrer, a thermometer, and a nitrogen induction tube under a nitrogen atmosphere. The mixture in the reactor vessel was heated to 70° C. with stirring at 200 rpm, thereby effecting the polymerization reaction for 12 hours, resulting in a solution including the polymer of the monomer composition dissolved in toluene. Subsequently, the solution was decreased in temperature down to 25° C. Then, the solution was charged into 1000.0 parts of methanol with stirring, thereby precipitating methanol insoluble matter. The resulting methanol insoluble matter was filtrated, and further washed with methanol, followed by vacuum drying at 40° C. for 24 hours, resulting in a polymer 1. The weight-average molecular weight of the polymer 1 was 68400, the melting point thereof was 62° C., and the acid value was 0.0 mgKOH/g.

The polymer A1 was analyzed by NMR, indicating that the monomer unit derived from behenyl acrylate was included in an amount of 28.9 mol %; the monomer unit derived from methacrylonitrile, 53.8%; and the monomer unit derived from styrene, 17.3 mol %. Each SP value of the monomer and the monomer unit derived from the monomer were calculated.

Preparation of Monomer Having Urethane Group

Methanol was charged in an amount of 50.0 parts in a reactor vessel. Then, KARENZ MOI [2-isocyanato ethyl methacrylate] (SHOWA DENKO K.K.) was added dropwise in an amount of 5.0 parts with stirring at 40° C. After completion of dropwise addition, with the temperature kept at 40° C., stirring was performed for 2 hours. Subsequently, unreacted methanol was removed by an evaporator, thereby preparing a monomer having a urethane group.

Preparation of Monomer Having Urea Group

Dibutylamine was charged in an amount of 50.0 parts in a reactor vessel. Then, KARENZ MOI [2-isocyanato ethyl methacrylate] was added dropwise in an amount of 5.0 parts with stirring at room temperature. After completion of dropwise addition, stirring was performed for 2 hours. Subsequently, unreacted dibutylamine was removed by an evaporator, thereby preparing a monomer having a urea group.

Manufacturing Examples of Polymers 2 to 26

The reaction was conducted in the same manner as in the manufacturing example of the polymer 1, except for changing respective monomers and numbers of parts by mass so as to be as shown in Table 1. As a result, polymers 2 to 26 were obtained. The physical properties are shown in Tables 2 to 4.

TABLE 1

| | First polymerizable monomer | | | Second polymerizable monomer | | | Third polymerizable monomer | | |
|---|---|---|---|---|---|---|---|---|---|
| Polymer No. | Type | Mass [part] | mol [%] | Type | Mass [part] | mol [%] | Type | Mass [part] | mol [%] |
| 1 | BEA | 67.0 | 28.9 | MN | 22.0 | 53.8 | St | 11.0 | 17.3 |
| 2 | BEA | 67.0 | 25.3 | AN | 22.0 | 59.5 | St | 11.0 | 15.2 |
| 3 | BEA | 50.0 | 26.0 | HPMA | 40.0 | 55.0 | St | 10.0 | 19.0 |
| 4 | BEA | 65.0 | 27.6 | AM | 25.0 | 56.9 | St | 10.0 | 15.5 |
| 5 | BEA | 40.0 | 11.4 | AN | 27.5 | 56.0 | St | 30.0 | 31.2 |
| | | | | UT | 2.5 | 1.4 | | | |
| 6 | BEA | 40.0 | 11.4 | AN | 27.5 | 56.3 | St | 30.0 | 31.3 |
| | | | | UR | 2.5 | 1.0 | | | |
| 7 | BEA | 61.0 | 27.4 | AA | 9.0 | 21.4 | MM | 30.0 | 51.2 |
| 8 | BEA | 60.0 | 26.2 | VA | 30.0 | 57.9 | St | 10.0 | 15.9 |
| 9 | BEA | 60.0 | 26.2 | MA | 30.0 | 57.9 | St | 10.0 | 15.9 |
| 10 | BEA | 89.0 | 58.8 | MN | 11.0 | 41.2 | — | — | — |
| 11 | BEA | 40.0 | 10.5 | MN | 60.0 | 89.5 | — | — | — |
| 12 | BEA | 40.0 | 11.8 | MN | 40.0 | 66.7 | St | 20.0 | 21.5 |
| 13 | BEA | 61.0 | 27.5 | MN | 9.0 | 23.0 | St | 30.0 | 49.5 |
| 14 | BEA | 34.0 | 11.4 | MN | 11.0 | 21.0 | St | 55.0 | 67.6 |
| 15 | SA | 67.0 | 32.3 | MN | 22.0 | 51.2 | St | 11.0 | 16.5 |
| 16 | MYA | 67.0 | 23.9 | MN | 22.0 | 57.6 | St | 11.0 | 18.5 |
| 17 | OA | 67.0 | 25.0 | MN | 22.0 | 56.8 | St | 11.0 | 18.2 |
| 18 | BEA | 63.0 | 28.2 | MN | 7.0 | 17.7 | St | 23.0 | 37.6 |
| | | | | AA | 7.0 | 16.5 | | | |
| 19 | BEA | 63.0 | 26.3 | MN | 15.0 | 35.5 | St | 15.0 | 22.8 |
| | | | | AA | 7.0 | 15.4 | | | |
| 20 | BEA | 47.0 | 20.0 | MN | 22.0 | 53.0 | St | 11.0 | 17.0 |
| | SA | 20.0 | 10.0 | | | | | | |
| 21 | BEA | 66.6 | 33.2 | AA | 4.8 | 12.6 | MM | 28.6 | 54.2 |
| 22 | BEA | 90.0 | 61.3 | MN | 10.0 | 38.7 | — | — | — |
| 23 | BEA | 61.0 | 28.0 | MN | 7.0 | 18.2 | St | 32.0 | 53.8 |
| 24 | HA | 61.0 | 28.6 | MN | 26.0 | 54.0 | St | 13.0 | 17.4 |

TABLE 1-continued

| Polymer No. | First polymerizable monomer | | | Second polymerizable monomer | | | Third polymerizable monomer | | |
|---|---|---|---|---|---|---|---|---|---|
| | Type | Mass [part] | mol [%] | Type | Mass [part] | mol [%] | Type | Mass [part] | mol [%] |
| 25 | BEA | 60.0 | 28.5 | — | — | — | St | 11.0 | 19.1 |
| | | | | | | | MM | 29.0 | 52.4 |
| 26 | BEA | 25.0 | 7.0 | VA | 75.0 | 93.0 | — | — | — |

The abbreviations in the table are as follows.
BEA: behenyl acrylate
SA: stearyl acrylate
MYA: myricyl acrylate
OA: octacosyl acrylate
HA: hexadecyl acrylate
MN: methacrylonitrile
AN: acrylonitrile
HPMA: 2-hydroxypropyl methacrylate
AM: acrylamide
UT: monomer having a urethane group
UR: monomer having a urea group
AA: acrylic acid
VA: vinyl acetate
MA: methyl acrylate
St: styrene
MM: methyl methacrylate

TABLE 2

| Polymer No. | First polymerizable monomer | | Second polymerizable monomer | | Third polymerizable monomer | | Formula (5) |
|---|---|---|---|---|---|---|---|
| | Monomer | $SP_{12}$ | Monomer | $SP_{22}$ | Monomer | $SP_{32}$ | $SP_{22} - SP_{12}$ |
| 1 | BEA | 17.69 | MN | 21.97 | St | 17.94 | 4.28 |
| 2 | BEA | 17.69 | AN | 22.75 | St | 17.94 | 5.05 |
| 3 | BEA | 17.69 | HPMA | 22.05 | St | 17.94 | 4.36 |
| 4 | BEA | 17.69 | AM | 29.13 | St | 17.94 | 11.43 |
| 5 | BEA | 17.69 | AN | 22.75 | St | 17.94 | 5.05 |
| | | | UT | 21.91 | | | 4.21 |
| 6 | BEA | 17.69 | AN | 22.75 | St | 17.94 | 5.05 |
| | | | UR | 20.86 | | | 3.17 |
| 7 | BEA | 17.69 | AA | 22.66 | MM | 18.27 | 4.97 |
| 8 | BEA | 17.69 | VA | 18.31 | St | 17.94 | 0.61 |
| 9 | BEA | 17.69 | MA | 18.31 | St | 17.94 | 0.61 |
| 10 | BEA | 17.69 | MN | 21.97 | — | — | 4.28 |
| 11 | BEA | 17.69 | MN | 21.97 | — | — | 4.28 |
| 12 | BEA | 17.69 | MN | 21.97 | St | 17.94 | 4.28 |
| 13 | BEA | 17.69 | MN | 21.97 | St | 17.94 | 4.28 |
| 14 | BEA | 17.69 | MN | 21.97 | St | 17.94 | 4.28 |
| 15 | SA | 17.71 | MN | 21.97 | St | 17.94 | 4.25 |
| 16 | MYA | 17.65 | MN | 21.97 | St | 17.94 | 4.32 |
| 17 | OA | 17.65 | MN | 21.97 | St | 17.94 | 4.32 |
| 18 | BEA | 17.69 | MN | 21.97 | St | 17.94 | 4.28 |
| | | | AA | 21.66 | | | 3.97 |
| 19 | BEA | 17.69 | MN | 21.97 | St | 17.94 | 4.28 |
| | | | AA | 21.66 | | | 3.97 |
| 20 | BEA | 17.69 | MN | 21.97 | St | 17.94 | 4.27 |
| | SA | 17.71 | | | | | |
| 21 | BEA | 17.69 | AA | 22.66 | MM | 18.27 | 4.97 |
| 22 | BEA | 17.69 | MN | 21.97 | — | — | 4.28 |
| 23 | BEA | 17.69 | MN | 21.97 | St | 17.94 | 4.28 |
| 24 | HA | 17.73 | MN | 21.97 | St | 17.94 | 4.24 |
| 25 | BEA | 17.69 | — | — | St | 17.94 | — |
| | | | | | MM | 18.27 | — |
| 26 | BEA | 17.69 | VA | 18.31 | — | — | 0.61 |

TABLE 3

| Polymer No. | Monomer unit derived from first polymerizable monomer | | Monomer unit derived from second polymerizable monomer | | Monomer unit derived from third polymerizable monomer | | Formula (1) |
|---|---|---|---|---|---|---|---|
| | Unit | $SP_{11}$ | Unit | $SP_{21}$ | Unit | $SP_{31}$ | $SP_{21} - SP_{11}$ |
| 1 | BEA | 18.25 | MN | 25.96 | St | 20.11 | 7.71 |
| 2 | BEA | 18.25 | AN | 29.43 | St | 20.11 | 11.19 |
| 3 | BEA | 18.25 | HPMA | 24.12 | St | 20.11 | 5.87 |
| 4 | BEA | 18.25 | AM | 39.25 | St | 20.11 | 21.01 |
| 5 | BEA | 18.25 | AN | 29.43 | St | 20.11 | 11.19 |
| | | | UT | 23.79 | | | 5.54 |
| 6 | BEA | 18.25 | AN | 29.43 | St | 20.11 | 11.19 |
| | | | UR | 21.74 | | | 3.50 |
| 7 | BEA | 18.25 | AA | 28.72 | MM | 20.31 | 10.47 |
| 8 | BEA | 18.25 | VA | 21.60 | St | 20.11 | 3.35 |
| 9 | BEA | 18.25 | MA | 21.60 | St | 20.11 | 3.35 |
| 10 | BEA | 18.25 | MN | 25.96 | — | — | 7.71 |
| 11 | BEA | 18.25 | MN | 25.96 | — | — | 7.71 |
| 12 | BEA | 18.25 | MN | 25.96 | St | 20.11 | 7.71 |
| 13 | BEA | 18.25 | MN | 25.96 | St | 20.11 | 7.71 |
| 14 | BEA | 18.25 | MN | 25.96 | St | 20.11 | 7.71 |
| 15 | SA | 18.39 | MN | 25.96 | St | 20.11 | 7.57 |
| 16 | MYA | 18.08 | MN | 25.96 | St | 20.11 | 7.88 |
| 17 | OA | 18.10 | MN | 25.96 | St | 20.11 | 7.85 |
| 18 | BEA | 18.25 | MN | 25.96 | St | 20.11 | 7.71 |
| | | | AA | 28.72 | | | 10.47 |
| 19 | BEA | 18.25 | MN | 25.96 | St | 20.11 | 7.71 |
| | | | AA | 28.72 | | | 10.47 |
| 20 | BEA | 18.25 | MN | 25.96 | St | 20.11 | 7.71 |
| | SA | 18.39 | | | | | |
| 21 | BEA | 18.25 | AA | 28.72 | MM | 20.31 | 10.47 |
| 22 | BEA | 18.25 | MN | 25.96 | — | — | 7.71 |
| 23 | BEA | 18.25 | MN | 25.96 | St | 20.11 | 7.71 |
| 24 | HA | 18.47 | MN | 25.96 | St | 20.11 | 7.49 |
| 25 | BEA | 18.25 | — | — | St | 20.11 | — |
| | | | | | MM | 20.31 | — |
| 26 | BEA | 18.25 | VA | 21.60 | — | — | 3.35 |

TABLE 4

| Polymer No. | Mw | $T_p$ [° C.] | Av [mgKOH/g] |
|---|---|---|---|
| 1 | 68400 | 62 | 0.0 |
| 2 | 67100 | 62 | 0.0 |
| 3 | 67500 | 59 | 0.0 |
| 4 | 63900 | 59 | 0.0 |
| 5 | 63900 | 55 | 0.0 |
| 6 | 68100 | 55 | 0.0 |
| 7 | 62800 | 57 | 70.0 |
| 8 | 64600 | 56 | 0.0 |
| 9 | 66400 | 54 | 0.0 |
| 10 | 65800 | 62 | 0.0 |
| 11 | 66500 | 56 | 0.0 |
| 12 | 62800 | 55 | 0.0 |
| 13 | 64600 | 57 | 0.0 |
| 14 | 64500 | 53 | 0.0 |
| 15 | 66400 | 54 | 0.0 |
| 16 | 62900 | 76 | 0.0 |
| 17 | 64500 | 78 | 0.0 |
| 18 | 67800 | 58 | 54.4 |
| 19 | 64700 | 61 | 54.5 |
| 20 | 66100 | 58 | 0.0 |
| 21 | 63500 | 56 | 37.3 |
| 22 | 67100 | 62 | 0.0 |
| 23 | 61900 | 56 | 0.0 |
| 24 | 66600 | 45 | 0.0 |

TABLE 4-continued

| Polymer No. | Mw | $T_p$ [° C.] | Av [mgKOH/g] |
|---|---|---|---|
| 25 | 63800 | 52 | 0.0 |
| 26 | 64600 | 59 | 0.0 |

Synthesis Example of Amorphous Resin 1 not being Polymer A

In an autoclave, 50 parts of xylene was charged, and the atmosphere in the autoclave was replaced with nitrogen. Then, the temperature was increased up to 185° C. with stirring in a closed state. A mixed solution of 95 parts of styrene, 5 parts of n-butyl acrylate, 5 parts of di-t-butyl peroxide, and 20 parts of xylene was added dropwise continuously for 3 hours with the temperature in the autoclave kept at 185° C. for polymerization. Further, the temperature was kept at the same temperature for another hour, thereby completing the polymerization. The solvent was removed, resulting in an amorphous resin 1 not being the polymer A. The resulting resin had a weight-average molecular weight (Mw) of 3500, a softening point (Tm) of 96° C., and a glass transition temperature (Tg) of 58° C.

Manufacturing Example of Polymer Fine Particle 1 Dispersed Solution

| | |
|---|---|
| Toluene (manufactured by Wako Pure Chemical Industries, Ltd.) | 300 parts |
| Polymer 1 | 100 parts |

The materials were weighed, and mixed, and the resulting mixture was dissolved at 90° C.

Separately, 5.0 parts of sodium dodecylbenzene sulfonate and 10.0 parts of sodium laurate were added to 700 parts of ion exchanged water, and the mixture was dissolved by heating at 90° C. Then, the toluene solution and aqueous solution were mixed together, and the mixture was stirred at 7000 rpm using a superfast stirring device T.K. ROBOMIX (manufactured by PRIMIX Corporation). Further, using a high pressure impact type dispersing machine Nanomizer (manufactured by Yoshida Kikai Co., Ltd.), emulsification was performed under a pressure of 200 MPa. Then, using an evaporator, toluene was removed, and the concentration was adjusted with ion exchanged water, resulting in an aqueous dispersion with a concentration of polymer fine particle 1 of 20 mass % (polymer fine particle 1 dispersion).

The 50% particle diameter (D50) based on volume distribution of the polymer fine particle 1 was measured using a dynamic light scattering particle size distribution meter Nanotrac UPA-EX150 (manufactured by Nikkiso Co., Ltd.), and was found to be 0.40 μm.

Manufacturing Example of Polymer Fine Particles 2 to 26 Dispersed Solutions

Emulsification was performed in the same manner as in the manufacturing example of the polymer fine particle 1 dispersion, except for changing respective polymers to those shown in Table 5. As a result, polymer fine particles 2 to 26 dispersions were obtained. The physical properties are shown in Table 5.

TABLE 5

| | Toluene solution | | | Aqueous solution | | Physical property |
| | | | | Sodium dodecyl- benzene | Sodium | |
| Polymer fine particle dispersion | Toluene Mass [part] | Polymer Type | Polymer Mass [part] | sulfonate Mass [part] | laurate Mass [part] | D50 [μm] |
|---|---|---|---|---|---|---|
| 1 | 300 | 1 | 100 | 5 | 10 | 0.4 |
| 2 | 300 | 2 | 100 | 5 | 10 | 0.4 |
| 3 | 300 | 3 | 100 | 5 | 10 | 0.4 |
| 4 | 300 | 4 | 100 | 5 | 10 | 0.4 |
| 5 | 300 | 5 | 100 | 5 | 10 | 0.4 |
| 6 | 300 | 6 | 100 | 5 | 10 | 0.4 |
| 7 | 300 | 7 | 100 | 5 | 10 | 0.4 |
| 8 | 300 | 8 | 100 | 5 | 10 | 0.4 |
| 9 | 300 | 9 | 100 | 5 | 10 | 0.4 |
| 10 | 300 | 10 | 100 | 5 | 10 | 0.4 |
| 11 | 300 | 11 | 100 | 5 | 10 | 0.4 |
| 12 | 300 | 12 | 100 | 5 | 10 | 0.4 |
| 13 | 300 | 13 | 100 | 5 | 10 | 0.4 |
| 14 | 300 | 14 | 100 | 5 | 10 | 0.4 |
| 15 | 300 | 15 | 100 | 5 | 10 | 0.4 |
| 16 | 300 | 16 | 100 | 5 | 10 | 0.4 |
| 17 | 300 | 17 | 100 | 5 | 10 | 0.4 |
| 18 | 300 | 18 | 100 | 5 | 10 | 0.4 |
| 19 | 300 | 19 | 100 | 5 | 10 | 0.4 |
| 20 | 300 | 20 | 100 | 5 | 10 | 0.4 |
| 21 | 300 | 21 | 100 | 5 | 10 | 0.4 |
| 22 | 300 | 22 | 100 | 5 | 10 | 0.4 |
| 23 | 300 | 23 | 100 | 5 | 10 | 0.4 |
| 24 | 300 | 24 | 100 | 5 | 10 | 0.4 |
| 25 | 300 | 25 | 100 | 5 | 10 | 0.4 |
| 26 | 300 | 26 | 100 | 5 | 10 | 0.4 |

Manufacturing Example of Amorphous Resin Fine Particle 1 Dispersed Solution not being Polymer A

| | |
|---|---|
| Tetrahydrofuran (manufactured by Wako Pure Chemical Industries, Ltd.) | 300 parts |
| Amorphous resin 1·not being polymer A | 100 parts |
| Anionic surfactant NeoGen RK (manufactured by DKS Co., Ltd.) | 0.5 part |

The materials were weighed, and mixed, and the resulting mixture was dissolved.

Then, 20.0 parts of 1 mol/L aqueous ammonia was added, and stirred at 4000 rpm using a superfast stirring device T.K. ROBOMIX (manufactured by PRIMIX Corporation). Further, 700 parts of ion exchanged water was added at a speed of 8 parts/min, thereby precipitating a fine particle of the amorphous resin 1. Then, using an evaporator, tetrahydrofuran was removed, and the concentration was adjusted with ion exchanged water, resulting in an aqueous dispersion (amorphous resin 1 fine particle dispersion) with a concentration of the fine particle of the amorphous resin 1 of 20 mass %.

The 50% particle diameter (D50) based on volume distribution of the fine particle of amorphous resin 1 was found to be 0.13 μm.

Manufacturing Example of Release Agent (Aliphatic Hydrocarbon Compound) Fine Particle Dispersed Solution

| | |
|---|---|
| Aliphatic hydrocarbon compound HNP-51 (manufactured by NIPPON SEIRO Co., Ltd.) | 100 parts |

-continued

| | |
|---|---|
| Anionic surfactant NeoGen RK (manufactured by DKS Co., Ltd.) | 5 parts |
| Ion exchanged water | 395 parts |

The materials were weighed, and were charged into a mixing vessel equipped with a stirrer, followed by heating to 90° C. The mixture was circulated to Clearmix W motion (manufactured by M Technique Co., Ltd.), and a dispersion treatment was performed for 60 minutes. The conditions for the dispersion treatment were set as follows.

| | |
|---|---|
| Rotary outer diameter | 3 cm |
| Clearance | 0.3 mm |
| Rotor revolution number | 19000 r/min |
| Screen revolution number | 19000 r/min |

After the dispersion treatment, under cooling conditions of a rotor revolution number of 1000 r/min, a screen revolution number of 0 r/min, and a cooling rate of 10° C./min, cooling was performed down to 40° C., resulting in an aqueous dispersion (release agent (aliphatic hydrocarbon compound) fine particle dispersion) with a concentration of the release agent (aliphatic hydrocarbon compound) fine particle of 20 mass %.

The 50% particle diameter (D50) based on volume distribution of the release agent (aliphatic hydrocarbon compound) fine particle was measured using a dynamic light scattering particle size distribution meter Nanotrac UPA-EX150 (manufactured by Nikkiso Co., Ltd.), and was found to be 0.15 μm.

Manufacturing of Coloring Agent Fine Particle Dispersed Solution

| | |
|---|---|
| Coloring agent (cyan pigment manufactured by Dainichiseika Color & Chemicals Mfg. Co., Ltd.: Pigment Blue 15:3) | 50.0 parts |
| Anionic surfactant NeoGen RK (manufactured by DKS Co., Ltd.) | 7.5 parts |
| Ion exchanged water | 442.5 parts |

The materials were weighed and mixed. The resulting mixture was dissolved. Using a high pressure impact type dispersing machine Nanomizer (manufactured by Yoshida Kikai Co., Ltd.), dispersion was performed for about 1 hour, resulting in an aqueous dispersion including a coloring agent dispersed therein with a concentration of coloring agent fine particle of 10 mass %.

The 50% particle diameter (D50) based on volume distribution of the coloring agent fine particle was measured using a dynamic light scattering particle size distribution meter Nanotrac UPA-EX150 (manufactured by Nikkiso Co., Ltd.), and was found to be 0.20 μm.

Manufacturing Example of Toner Particle 1

| | |
|---|---|
| Polymer fine particle 1 dispersion | 500 parts |
| Release agent (aliphatic hydrocarbon compound fine particle dispersion) | 50 parts |
| Coloring agent fine particle dispersion | 80 parts |
| Ion exchanged water | 160 parts |

Respective materials described above were charged into a round stainless flask. Subsequently, using a homogenizer Ultra Turrax T50 (manufactured by IKA Co.), dispersion was performed at 5000 r/min for 10 minutes. An 1.0% nitric acid aqueous solution was added thereto, thereby adjusting the pH to 3.0. Then, while appropriately adjusting the revolution number so as to stir the mixed solution using a stirring blade in a heating water bath, heating was performed up to 58° C. The volume-average particle diameter of the formed aggregated particle was appropriately confirmed using a Coulter Multisizer III. Upon formation of an aggregated particle with a weight-average particle diameter (D4) of about 6.00 μm, the pH was set at 9.0 using a 5% sodium hydroxide aqueous solution. Then, while continuing stirring, heating was performed up to 75° C. Then, the resulting mixture was held at 75° C. for 1 hour, thereby fusing the aggregated particle.

Then, the resulting mixture was cooled down to 50° C., and held for 3 hours, thereby promoting crystallization of the polymer.

Then, the resulting product was cooled down to 25 degrees, and subjected to filtration/solid liquid separation, followed by washing with ion exchanged water. After completion of washing, drying was performed using a vacuum dryer, resulting in a toner particle 1 with a weight-average particle diameter (D4) of about 6.1 μm.

Manufacturing Example of Toner Particle 2

| | |
|---|---|
| Monomer composition (the monomer composition is assumed to be a mixture including the following behenyl acrylate/methacrylonitrile/styrene in the following ratios.) | 100.0 parts |
| behenyl acrylate | 67.0 parts (28.9 mol %) |
| methacrylonitrile | 22.0 parts (53.8 mol %) |
| styrene | 11.0 parts (17.3 mol %) |
| Coloring agent Pigment Blue 15:3 | 6.5 parts |
| Aluminum di-t-butyl salicilate | 1.0 part |
| Paraffin wax (HNP-51: manufactured by NIPPON SEIRO Co., Ltd.) | 10.0 parts |
| Toluene | 100.0 parts |

A mixture including the materials described above was prepared. The mixture was charged into an attritor (manufactured by NIPPON COKE & ENGINEERING CO., LTD.), and was dispersed using a zirconia bead with a diameter of 5 mm at 200 rpm for 2 hours, resulting in a raw material dispersion.

On the other hand, into a container equipped with a high speed stirring device homomixer (manufactured by PRIMIX Corporation) and a thermometer, 735.0 parts of ion exchanged water and 16.0 parts of trisodium phosphate (12-hydrate) were added, and the temperature was increased to 60° C. with stirring at 12000 rpm. Thereto, a calcium chloride aqueous solution obtained by dissolving 9.0 parts of calcium chloride (2-hydrate) to 65.0 parts of ion exchanged water was charged, and the mixture was stirred at 12000 rpm for 30 minutes with the temperature kept at 60° C. Thereto, 10% hydrochloric acid was added, thereby adjusting the pH to 6.0, resulting in aqueous medium including a dispersion stabilizer.

Subsequently, the raw material dispersion was transferred to a container equipped with a stirring device and a thermometer, and the temperature was increased to 60° C. with stirring at 100 rpm. Thereto, as a polymerization initiator, 8.0 parts of t-butylperoxypivalate (perbutyl PV: manufactured by NOF Corporation) was added, and the mixture was stirred at 100 rpm for 5 minutes with the temperature kept at 60° C. Then, the mixture was charged into the aqueous medium being stirred at 12000 rpm by the high speed stirring device. With the temperature kept at 60° C., stirring was continued at 12000 rpm for 20 minutes by the high speed stirring device, resulting in a granule solution.

The granule solution was transferred into a reactor vessel equipped with a reflux condenser, a stirrer, a thermometer, and a nitrogen induction tube. With stirring at 150 rpm under a nitrogen atmosphere, the temperature was increased to 70° C. With the temperature kept at 70° C., a polymerization reaction was conducted at 150 rpm for 10 hours. Then, the reflux condenser was removed from the reactor vessel, and the temperature of the reaction liquid was increased up to 95° C. Then, with the temperature kept at 95° C., the reaction liquid was stirred at 150 rpm for 5 hours, thereby removing toluene, resulting in a toner particle dispersion.

The resulting toner particle dispersion was cooled down to 20° C. with stirring at 150 rpm. Then, with stirring kept, dilute hydrochloric acid was added thereto until the pH becomes 1.5, thereby dissolving the dispersion stabilizer. The solid content was filtrated, and sufficiently washed with ion exchanged water, following by vacuum drying at 40° C. for 24 hours, resulting in a toner particle 2.

Manufacturing Example of Toner Particle 3
Manufacturing of Fine Particle Dispersed Solution 1

Into a reactor vessel including a stirring rod and a thermometer set therein, 683.0 parts of water, 11.0 parts of sodium salt of methacrylic acid EO adduct sulfuric acid ester (ELEMINOL RS-30, manufactured by Sanyo Chemical Industries, Ltd.), 130.0 parts of styrene, 138.0 parts of methacrylic acid, 184.0 parts of n-butyl acrylate, and 1.0 part of ammonium persulfate were charged, and the mixture was stirred at 400 revolutions/min for 15 minutes, resulting in a white suspension. The resulting suspension was heated, and the temperature was increased up to a system temperature of 75° C., and the reaction was conducted for 5 hours. Further, 30.0 parts of a 1% ammonium persulfate aqueous solution was added thereto, and the mixture was aged at 75° C. for 5 hours, resulting in a vinyl polymer fine particle dispersion 1. The volume-average particle diameter of the fine particle dispersion 1 was 0.15 μm.

| Preparation of Coloring Agent Dispersed Solution 1 | |
| --- | --- |
| C.I. Pigment Blue 15:3 | 100.0 parts |
| Ethyl acetate | 150.0 parts |
| Glass bead (1 mm) | 200.0 parts |

The materials were charged into a heat resistant glass container, and were dispersed for 5 hours by a paint shaker. Glass beads were removed by a nylon mesh, resulting in a coloring agent dispersion 1.

| Preparation of Wax Dispersed Solution 1 | |
| --- | --- |
| Paraffin wax (HNP-51: manufactured by NIPPON SEIRO Co., Ltd.) | 20.0 parts |
| Ethyl acetate | 80.0 parts |

The materials were charged into a closable reactor vessel, and the mixture was heated at 80° C. with stirring. Then, the inside of the system was cooled down to 25° C. over 3 hours with slow stirring at 50 rpm, resulting in a milk white liquid.

The solution was charged together with 30.0 parts of glass beads with a diameter of 1 mm into a heat resistant container, and the mixture was dispersed with a paint shaker (manufactured by TOYO SEIKI Co., Ltd.) for 3 hours. Glass beads were removed by a nylon mesh, resulting in a wax dispersion 1.

| Preparation of Oil Phase 1 | |
| --- | --- |
| Polymer (A1) | 100.0 parts |
| Ethyl acetate | 85.0 parts |

The materials were placed in a beaker, and the mixture was stirred by Disper (manufactured by TOKUSHU KIKA Co.) at 3000 rpm for 1 minute.

| | |
| --- | --- |
| Wax dispersion 1 (solid content 20%) | 50.0 parts |
| Coloring agent dispersion 1 (solid content 40%) | 12.5 parts |
| Ethyl acetate | 5.0 parts |

Further, the materials were placed in a beaker, and the mixture was stirred by Disper (manufactured by TOKUSHU KIKA Co.) at 6000 rpm for 3 minutes, thereby preparing an oil phase 1.

| Preparation of Aqueous Phase 1 | |
| --- | --- |
| Fine particle dispersion 1 | 15.0 parts |
| Sodium dodecyl diphenyl ether disulfonate aqueous solution (ELEMINOL MON7, manufactured by Sanyo Chemical Industries, Ltd.) | 30.0 parts |
| Ion exchanged water | 955.0 parts |

The materials were placed in a beaker, and the mixture was stirred by Disper (manufactured by TOKUSHU KIKA Co.) at 3000 rpm for 3 minutes, thereby preparing an aqueous phase 1.

Manufacturing of Toner Particle 3

The oil phase 1 was charged into the aqueous phase 1, and the mixture was dispersed by a TK homomixer (manufactured by TOKUSHU KIKA Co.) at a revolution number of 10000 rpm for 10 minutes. Then, at 30° C., and under reduced pressure of 50 mmHg, desolvation was performed for 30 minutes. Then, filtration was performed. The operation of filtration and redispersion into ion exchanged water was repeated until the conductivity of the slurry became 100 μS, thereby removing the surfactant, resulting in a filter cake.

The filter cake was vacuum dried, followed by air classification, resulting in a toner particle 3.

Manufacturing Example of Toner Particle 4

| | |
| --- | --- |
| Polymer 1 | 100 parts |
| Aliphatic hydrocarbon compound HNP-51 (manufactured by NIPPON SEIRO Co., Ltd.) | 10 parts |
| C.I. Pigment Blue 15:3 | 6.5 parts |
| Aluminum 3,5-di-t-butyl salicylate compound | 0.5 part |

The materials were mixed using a Henschel mixer (FM-75 type, manufactured by NIPPON COKE & ENGINEERING CO., LTD) at a revolution number of 20 s$^{-1}$ for a revolution time of 5 min. Then, the mixture was kneaded with a twin screw kneader (PCM-30 type, manufactured by IKEGAI Co., Ltd.) set at a temperature of 120° C. at an outlet temperature of 135° C. The resulting kneaded product was cooled at a cooling rate of 15° C./min, and was coarsely pulverized to 1 mm or less with a hammer mill, resulting in a coarsely pulverized product.

The resulting coarsely pulverized product was finely pulverized by a mechanical pulverizer (T-250, manufactured by FREUND-TURBO CORPORATION). Further, using Faculty F-300 (manufactured by HOSOKAWA MICRON Corporation), classification was performed, resulting in a toner particle 4. The operation conditions were set as a classification rotor revolution number of 130 s$^{-1}$, and a dispersion rotor revolution number of 120 s$^{-1}$.

Manufacturing Example of Toner 1

| Toner particle 1 | 100 parts |
| --- | --- |

Large particle diameter silica fine particle surface treated with hexamethyldisilazane having an average particle diameter of 130 nm3 parts
Small particle diameter silica fine particle surface treated with hexamethyldisilazane having an average particle diameter of 20 nm 1 part Respective materials described above were mixed with a Henschel mixer FM-10C type (manufactured by Mitsui Miike Machinery Co., Ltd.) at a revolution number of 30 s$^{-1}$, and at a revolution time of 10 min, resulting in a toner 1. The weight-average particle diameter (D4) of the toner 1 was 6.07 μm.

Manufacturing Examples of Toner Particles 2 to 31

Toner particles 5 to 31 were obtained in the same manner as with the manufacturing example of the toner particle 1, except for changing the formulation of the polymer 1 as shown in Table 8. Incidentally, for the toner particles 24 and 25, the dispersion of the polymer fine particle 1 and the fine particle dispersion of the amorphous resin 1 were mixed so as to achieve each amount shown in Table 6.

Manufacturing Examples of Toners 2 to 31

Manufacturing was performed in the same manner as in the manufacturing example of the toner 1, except for changing the toner particle into the one described in Table 6, resulting in toners 2 to 31.

TABLE 6

| Toner No. | Toner particle No. | Manufacturing method | Binder resin | Number of parts | Other resins | Number of parts |
| --- | --- | --- | --- | --- | --- | --- |
| 1 | 1 | EAM | Polymer 1 | 100 parts | None | — |
| 2 | 2 | SPM | Polymer 1 | 100 parts | None | — |
| 3 | 3 | DSM | Polymer 1 | 100 parts | None | — |
| 4 | 4 | MKM | Polymer 1 | 100 parts | None | — |
| 5 | 24 | EAM | Polymer 1 | 51 parts | Amorphous resin 1 | 49 parts |
| 6 | 25 | EAM | Polymer 1 | 40 parts | Amorphous resin 1 | 60 parts |
| 7 | 10 | EAM | Polymer 7 | 100 parts | None | — |
| 8 | 11 | EAM | Polymer 8 | 100 parts | None | — |
| 9 | 14 | EAM | Polymer 11 | 100 parts | None | — |
| 10 | 22 | EAM | Polymer 19 | 100 parts | None | — |
| 11 | 23 | EAM | Polymer 20 | 100 parts | None | — |
| 12 | 15 | EAM | Polymer 12 | 100 parts | None | — |
| 13 | 12 | EAM | Polymer 9 | 100 parts | None | — |
| 14 | 13 | EAM | Polymer 10 | 100 parts | None | — |
| 15 | 6 | EAM | Polymer 3 | 100 parts | None | — |
| 16 | 8 | EAM | Polymer 5 | 100 parts | None | — |
| 17 | 5 | EAM | Polymer 2 | 100 parts | None | — |
| 18 | 7 | EAM | Polymer 4 | 100 parts | None | — |
| 19 | 9 | EAM | Polymer 6 | 100 parts | None | — |
| 20 | 16 | EAM | Polymer 13 | 100 parts | None | — |

TABLE 6-continued

| Toner No. | Toner particle No. | Manufacturing method | Binder resin | Number of parts | Other resins | Number of parts |
| --- | --- | --- | --- | --- | --- | --- |
| 21 | 17 | EAM | Polymer 14 | 100 parts | None | — |
| 22 | 18 | EAM | Polymer 15 | 100 parts | None | — |
| 23 | 19 | EAM | Polymer 16 | 100 parts | None | — |
| 24 | 20 | EAM | Polymer 17 | 100 parts | None | — |
| 25 | 21 | EAM | Polymer 18 | 100 parts | None | — |
| 26 | 26 | EAM | Polymer 21 | 100 parts | None | — |
| 27 | 27 | EAM | Polymer 22 | 100 parts | None | — |
| 28 | 28 | EAM | Polymer 23 | 100 parts | None | — |
| 29 | 29 | EAM | Polymer 24 | 100 parts | None | — |
| 30 | 30 | EAM | Polymer 25 | 100 parts | None | — |
| 31 | 31 | EAM | Polymer 26 | 100 parts | None | — |

The abbreviations in the Table 6 are as follows.
EAM: emulsion aggregation method
SPM: suspension polymerization method
DSM: dissolution suspension method
MKM: melt kneading method Manufacturing Example of Magnetic Carrier

| Manufacturing Example of Magnetic Core 1 Step 1 (Weighing/Mixing Step) | |
| --- | --- |
| $Fe_2O_3$ | 69.3 mass % |
| $MnCO_3$ | 27.5 mass % |
| $Mg(OH)_2$ | 1.7 mass % |
| $SrCO_3$ | 1.5 mass % |

The ferrite raw materials were weighed, and 20 parts of water was added to 80 parts of the ferrite raw material. Then, using zirconia with a diameter of 10 mm, wet mixing was performed with a ball mill for 3 hours, thereby preparing a slurry. The solid content concentration of the slurry was set at 80 mass %.

Step 2 (Pre-Baking Step)

The mixed slurry was dried by a spray dryer (manufactured by OHKAWARA KAKOHKI Co., Ltd.), followed by baking by a batch type electric furnace under a nitrogen atmosphere (oxygen concentration 1.0 vol %), at a temperature of 1070° C. for 3.0 hours, thereby manufacturing a pre-baked ferrite.

Step 3 (Pulverizing Step)

The calcined ferrite was pulverized to about 0.5 mm by a crusher. Then, water was added thereto, thereby preparing a slurry. The solid content concentration of the slurry was set at 70 mass %. By a wet ball mill using ⅛-inch stainless beads, pulverization was performed for 3.5 hours, resulting in a slurry. Further, the slurry was pulverized by a wet bead mill using zirconia with a diameter of 1 mm for 4 hours, resulting in a calcined ferrite slurry with a volume-based 50% particle diameter (D50) of 1.1 μm.

Step 4 (Granulating Step)

To 100 parts of the calcined ferrite slurry, 1.0 part of ammonium polycarbonate as a dispersant, and 1.5 parts of polyvinyl alcohol as a binder were added, followed by granulation into a spherical particle and drying by a spray dryer (manufactured by OHKAWARA KAKOHKI Co., Ltd.). The resulting granulated product was adjusted in particle size, followed by heating at 720° C. for 2 hours using a rotary electric furnace, thereby removing the organic matters such as the organic dispersant and the binder.

Step 5 (Baking Step)

Under a nitrogen atmosphere (oxygen concentration of 1.0 vol %), the resulting product was held and baked by setting the time required for the temperature to change from room temperature to the baking temperature (1100° C.) at 1.7 hours, at a temperature of 1180° C. for 4.5 hours. Subsequently, the temperature was reduced down to 60° C. over 8 hours, and the atmosphere was changed from the nitrogen atmosphere back to the air. The product was taken out at a temperature of 40° C. or lower.

Step 6 (Selecting Step)

After disintegrating the aggregated particles, sieving was performed by a sieve with an opening of 150 μm, thereby removing coarse particles. Air classification was performed, thereby removing fine powder. Further, the low magnetic force component was removed by magnetic separation, resulting in a pre-magnetic core 1. The resulting pre-magnetic core 1 was porous, and had a hole. The pre-magnetic core 1 had a D50 of 41.3 μm, a magnetization amount of 60 $Am^2$/kg, a peak pore diameter of 0.45 μm, and a pore volume of 45 $mm^3$/g.

Manufacturing of Filling Resin Composition 1

Methyl silicone oligomer (KR-400: manufactured by Shin-Etsu Silicone Co., Ltd.): 95.0 parts γ-amino propyl triethoxysilane (KBM-903: manufactured by Shin-Etsu Silicone Co., Ltd.): 5.0 parts The materials were mixed, resulting in a filler resin composition 1.

Filling Step

The pre-magnetic core 1 was placed in an amount of 100 parts in a stirring container of a mixing stirrer (universal stirrer NDMV type manufactured by DALTON Corporation), and the temperature was kept at 60° C., and 7 parts of the filler resin composition 1 was added dropwise to the pre-magnetic core 1 under ordinary pressure.

After completion of dropwise addition, while adjusting the time, stirring was continued, and the temperature was increased up to 70° C., thereby filler the resin composition in the particle of the pre-magnetic core 1.

The resin-filled type magnetic core obtained after cooling was transferred to a mixer having a spiral blade in a rotatable mixing container (drum mixer UD-AT type manufactured by Sugiyama heavy industrial Co., Ltd.). Under a nitrogen atmosphere, the temperature was increased up to a curing temperature of 140° C. at a ramp rate of 2° C./min with stirring. Subsequently, heating with stirring was continued for a curing time of 50 minutes still at 140° C.

Subsequently, the temperature was cooled down to room temperature, and a ferrite particle including resin filled therein and cured was taken out. Using a magnetic separator, a non-magnetic product was removed. Further, coarse particles were removed by a vibration sieve, resulting in a resin-filled type magnetic core 1. The resin-filled type magnetic core 1 had a D50 of 41.3 μm, and a magnetization amount of 60 $Am^2$/kg.

Manufacturing Example of Magnetic Core 2

Manufacturing Example of Amorphous Magnetic Particle a $Fe_3O_4$ was mixed and pulverized by a wet ball mill for 10 hours. 1 part of polyvinyl alcohol was added thereto, and the resulting mixture was granulated and dried by a spray dryer. Baking was performed at 900° C. for 10 hours by an electric furnace under a nitrogen atmosphere with an oxygen concentration of 0.0 vol %.

The resulting magnetic body was pulverized by a dry ball mill for 5 hours. By an air classification machine (Elbow jet labo EJ-L3, manufactured by Nittetsu Mining Co. Ltd.), classification was performed, thereby classifying and removing fine power and coarse powder at the same time, resulting in an amorphous magnetic particle a with a number average particle diameter of 1.7 μm.

Preparation of Magnetic Particle A

To 100 L of slurry including the amorphous magnetic particle a adjusted in number average particle diameter to 1.7 μm in an amount of 90 g/L, a sodium hydroxide solution was added at a temperature of 90° C., thereby adjusting the pH to 8.5. Then, 30 L of 2.5 mol/L manganese sulfate aqueous solution and a sodium hydroxide aqueous solution were added at the same time over 190 minutes while adjusting the pH to 8.5±0.2. Then, the resulting mixture was aged for 60 minutes, and then, dilute sulfuric acid was added, thereby adjusting the pH to 7.0, followed by filtration, water washing, and drying. As a result, an amorphous magnetic particle A surface treated with Mn was obtained.

Further, the resulting amorphous magnetic particle A and a silane type coupling agent (3-(2-amino ethyl amino)propyl trimethoxysilane) (in an amount of 0.2 part for every 100 parts of amorphous magnetic particle A) were introduced into a container.

Then, in the container, high speed mixing and stirring were performed at 100° C. for 1 hour for surface treatment, resulting in a magnetic particle A for a magnetic body-dispersed type magnetic core 2. The magnetic particle A had a number average particle diameter of 1.7 μm.

Manufacturing Example of Amorphous Magnetic Particle B $Fe_3O_4$ was mixed and pulverized by a wet ball mill for 10 hours. 1 part of polyvinyl alcohol was added thereto, and the resulting mixture was granulated and dried by a spray dryer. Baking was performed at 900° C. for 10 hours by an electric furnace under a nitrogen atmosphere with an oxygen concentration of 0.0 vol %.

The resulting magnetic body was pulverized by a dry ball mill for 10 hours. By an air classification machine (Elbow jet labo EJ-L3, manufactured by Nittetsu Mining Co., Ltd.), classification was performed, thereby classifying and removing fine power and coarse powder at the same time, resulting in an amorphous magnetic particle B with a number average particle diameter of 0.3 μm.

Preparation of Magnetic Particle B

The resulting amorphous magnetic particle B and a silane type coupling agent (3-glycidoxypropylmethyl dimethoxysilane) (in an amount of 1.2 parts for every 100 parts of amorphous magnetic particle B) were introduced into a container. Then, in the container, high speed mixing and stirring were performed at 100° C. for 1 hour for surface treatment, resulting in a magnetic particle B for a magnetic body-dispersed type magnetic core 2.

| Dispersing Step | |
| --- | --- |
| Phenol | 10.0 parts |
| Formaldehyde solution (formaldehyde 37 mass % aqueous solution) | 15.0 parts |
| Magnetic particle A | 10.0 parts |
| Magnetic particle B | 90.0 parts |
| 25 mass % aqueous ammonia | 3.5 parts |
| Water | 15.0 parts |

The materials were introduced into a reaction kettle, and were mixed well with the temperature set at 40° C. Then, the mixture was heated with stirring at an average ramp rate of 1.5° C./min to a temperature of 85° C., and was held at a temperature of 85° C., thereby to effect a polymerization reaction for 3 hours for curing. The peripheral speed of the stirring blade at this step was set at 1.96 m/sec.

After the polymerization reaction, the mixture was cooled to a temperature of 30° C., and water was added thereto. The supernatant liquid was removed, and the resultant precipitate was washed with water, and further air-dried. The resultant air-dried product was dried under reduced pressure (5 mmHg or less), at 180° C. for 5 hours, resulting in a magnetic body-dispersed type magnetic core 2. The magnetic body-dispersed type magnetic core 2 had a D50 of 43.1 µm, and a magnetization amount of 62 Am$^2$/kg. Further, M1/F1 was 0.041, and M2/F2 was 3.0.

Manufacturing Example of Magnetic Core 3

As a magnetic core 3, a commercially available ferrite particle EF-35 (manufactured by Powdertech Co., Ltd.) was used. The magnetic core 3 had a D50 of 42.0 µm, and a magnetization amount of 61 Am$^2$/kg.

Manufacturing Example of Coating Resin Polymer 101 Solution

| Cyclohexyl methacrylate: | 37.3 parts |
|---|---|
| Methyl methacrylate: | 62.7 parts |

The materials were added to a four-neck flask equipped with a reflux condenser, a thermometer, a nitrogen inlet tube, and a grinding system stirring device. Further, 100 parts of toluene, 100 parts of methyl ethyl ketone, and 2.4 parts of azobisisovaleronitrile were added thereto, and the mixture was held under a nitrogen flow at 80° C. for 10 hours, resulting in a polymer 101 solution (solid content 35 mass %).

Manufacturing Example of Coating Resin Polymer 102 to 115 Solutions

The reaction was performed in the same manner as in the manufacturing example of a coating resin polymer 101 solution, except for changing respective monomers, and the numbers of parts by mass as shown in Table 7, resulting in solutions of polymers 102 to 115. The SP values of the monomer units of the polymers 101 to 115 are shown in Table 7.

Manufacturing Example of Magnetic Carrier 1

A coating resin polymer solution was diluted with toluene so that the resin component is included in an amount of 5 mass %, thereby preparing a sufficiently stirred resin solution. Subsequently, into a planetary screw mixer (Nauta mixer VN type manufactured by HOSOKAWA MICRON Corporation) kept at a temperature of 60° C., the resin solution was charged so as to achieve a coating resin amount of 2.0 mass % in terms of solid content of the resin component for every 100 parts of the magnetic core particle. Charging was performed in the following manner. A half amount of the resin solution was charged, and solvent removal and application operations were performed for 30 minutes. Then, another half amount of the resin solution was charged, and solvent removal and application operations were performed for 40 minutes.

Then, a magnetic carrier coated with a coating resin composition was transferred to a mixer having a spiral blade in a rotatable mixing container (Drum mixer UD-AT type manufactured by Sugiyama heavy industrial Co., Ltd.). With stirring by rotating the mixing container at 10 revolutions per minute, a heat treatment was performed under a nitrogen atmosphere at a temperature of 120° C. for 2 hours. The resulting magnetic carrier was subjected to magnetic separation, so that a low magnetic force product was separated, and was passed through a sieve with an aperture of 150 µm, followed by classification by an air classifier, resulting in a magnetic carrier 1.

Manufacturing Examples of Magnetic Carriers 2 to 19

The reaction was performed in the same manner as in the manufacturing example of the magnetic carrier 1, except for changing respective polymers, other resins, and the numbers of parts as shown in Table 8, resulting in magnetic carriers 2 to 19. The MR2/MR1 and the glass transition temperature of the coating resin are shown in Table 8.

TABLE 7

| Polymer | Polymerizable monomer (a) | | | Polymerizable monomer (b) | | | Monomer unit derived from polymerizable monomer (a) | | Monomer unit derived from polymerizable monomer (b) | |
|---|---|---|---|---|---|---|---|---|---|---|
| | Type | Mass [part] | mol [%] | Type | Mass [part] | mol [%] | Unit | SP(a) | Unit | SP(b) |
| 101 | MMA | 37.3 | 50 | CHMA | 62.7 | 50 | MMA | 20.31 | CHMA | 20.12 |
| 102 | MMA | 30.9 | 50 | CDMA | 69.1 | 50 | MMA | 20.31 | CDMA | 19.35 |
| 103 | VA | 33.9 | 50 | CHMA | 66.1 | 50 | VA | 21.60 | CHMA | 20.12 |
| 104 | MMA | 84.3 | 90 | CHMA | 15.7 | 10 | MMA | 20.31 | CHMA | 20.12 |
| 105 | MMA | 91.9 | 95 | CHMA | 8.1 | 5 | MMA | 20.31 | CHMA | 20.12 |
| 106 | MMA | 6.2 | 10 | CHMA | 93.8 | 90 | MMA | 20.31 | CHMA | 20.12 |
| 107 | MMA | 3.0 | 5 | CHMA | 97.0 | 95 | MMA | 20.31 | CHMA | 20.12 |
| 108 | MMA | 1.8 | 3 | CHMA | 98.2 | 97 | MMA | 20.31 | CHMA | 20.12 |
| 109 | MA | 33.9 | 50 | CHMA | 66.1 | 50 | MA | 21.60 | CHMA | 20.12 |
| 110 | MA | 25.4 | 40 | CHMA | 74.6 | 60 | MA | 21.60 | CHMA | 20.12 |
| 111 | MMA | 41.3 | 50 | BMA | 58.7 | 50 | MMA | 20.31 | BMA | 19.32 |
| 112 | MMA | 37.0 | 50 | HMA | 63.0 | 50 | MMA | 20.31 | HMA | 18.98 |
| 113 | AA | 30.0 | 50 | CHMA | 70.0 | 50 | AA | 28.72 | CHMA | 20.12 |
| 114 | MMA | 100.0 | 100 | — | — | — | MMA | 20.31 | — | — |
| 115 | — | — | — | CHMA | 100.0 | 100 | — | — | CHMA | 20.12 |

The abbreviations in Table 7 are as follows.
MMA: methyl methacrylate
CHMA: cyclohexyl methacrylate
CDMA: cyclodecyl methacrylate
VA: vinyl acetate
MA: methyl acrylate
BMA: butyl methacrylate
HMA: hexyl methacrylate
AA: acrylic acid

TABLE 8

| Magnetic carrier No. | Core particle No. | Polymer No. | Number of parts | Other resins | Number of parts | MR2/MR1 | Glass transition point [° C.] |
|---|---|---|---|---|---|---|---|
| 1 | 1 | 101 | 100 | None | — | 0.6 | 94 |
| 2 | 2 | 101 | 100 | None | — | — | 94 |
| 3 | 3 | 101 | 100 | None | — | — | 94 |
| 4 | 3 | 101 | 50 | Amorphous polymer 1 | 50 | — | 87 |
| 5 | 3 | 101 | 40 | Amorphous polymer 1 | 60 | — | 86 |
| 6 | 3 | 102 | 100 | None | — | — | 93 |
| 7 | 3 | 103 | 100 | None | — | — | 58 |
| 8 | 3 | 104 | 100 | None | — | — | 103 |
| 9 | 3 | 105 | 100 | None | — | — | 104 |
| 10 | 3 | 106 | 100 | None | — | — | 85 |
| 11 | 3 | 107 | 100 | None | — | — | 84 |
| 12 | 3 | 108 | 100 | None | — | — | 94 |
| 13 | 3 | 109 | 100 | None | — | — | 46 |
| 14 | 3 | 110 | 100 | None | — | — | 38 |
| 15 | 3 | 111 | 100 | None | — | — | 98 |
| 16 | 3 | 112 | 100 | None | — | — | 91 |
| 17 | 3 | 113 | 100 | None | — | — | 95 |
| 18 | 3 | 114 | 100 | None | — | — | 105 |
| 19 | 3 | 115 | 100 | None | — | — | 83 |

Manufacturing Example of Two-component Developer 1

Toner 1 was added in an amount of 8.0 parts to 92.0 parts of magnetic carrier 1, and the materials were mixed by a V type mixer (V-20, manufactured by SHEISHIN ENTERPRISE Co., Ltd.), resulting in a two-component developer 1.

Manufacturing Examples of Two-component Developers 2 to 46

Manufacturing was performed in the same manner as in the manufacturing example of the two-component developer 1, except for changing each toner and each carrier as shown in Table 9, resulting in two-component developers 2 to 46. The value of E/F and the time constant of charging are shown in Table 9.

TABLE 9

| Two-component developer No. | Toner No. | Magnetic carrier No. | E/F | Time constant of charging [sec] |
|---|---|---|---|---|
| 1 | 1 | 1 | 0.70 | 288 |
| 2 | 2 | 2 | 0.70 | 292 |
| 3 | 3 | 3 | 0.70 | 301 |
| 4 | 4 | 4 | 0.70 | 339 |
| 5 | 1 | 5 | 0.70 | 388 |
| 6 | 1 | 6 | 0.70 | 394 |
| 7 | 1 | 7 | 0.70 | 395 |
| 8 | 1 | 8 | 0.39 | 425 |
| 9 | 1 | 9 | 0.37 | 464 |
| 10 | 1 | 10 | 3.49 | 386 |
| 11 | 1 | 11 | 6.99 | 422 |
| 12 | 1 | 12 | 11.65 | 510 |
| 13 | 1 | 13 | 0.70 | 303 |
| 14 | 1 | 14 | 0.58 | 305 |
| 15 | 5 | 1 | 0.70 | 307 |
| 16 | 6 | 1 | 0.70 | 304 |
| 17 | 7 | 1 | 0.60 | 305 |
| 18 | 8 | 1 | 0.64 | 304 |
| 19 | 9 | 1 | 0.65 | 381 |
| 20 | 10 | 1 | 0.34 | 309 |
| 21 | 11 | 1 | 0.34 | 308 |
| 22 | 12 | 1 | 1.12 | 309 |
| 23 | 13 | 1 | 0.62 | 303 |
| 24 | 14 | 1 | 0.62 | 304 |
| 25 | 15 | 1 | 1.18 | 375 |
| 26 | 16 | 1 | 0.21 | 378 |
| 27 | 17 | 1 | 0.30 | 305 |
| 28 | 18 | 1 | 1.09 | 308 |
| 29 | 19 | 1 | 0.70 | 307 |
| 30 | 20 | 1 | 0.77 | 308 |
| 31 | 21 | 1 | 0.59 | 384 |
| 32 | 22 | 1 | 0.61 | 384 |
| 33 | 23 | 1 | 0.90 | 304 |
| 34 | 24 | 1 | 0.68 | 306 |
| 35 | 25 | 1 | 0.72 | 341 |
| 36 | 1 | 15 | 0.70 | 377 |
| 37 | 31 | 1 | 0.14 | 464 |
| 38 | 26 | 1 | 1.45 | 558 |
| 39 | 27 | 1 | 1.23 | 620 |
| 40 | 28 | 1 | 1.21 | 311 |
| 41 | 29 | 1 | 0.69 | 315 |
| 42 | 30 | 1 | 2.00 | 616 |
| 43 | 1 | 16 | 0.70 | 638 |
| 44 | 1 | 17 | 0.70 | 625 |
| 45 | 1 | 18 | — | 689 |
| 46 | 1 | 19 | — | 710 |

Evaluation of Two-Component Developer

The evaluation method of two-component developers 1 to 46 will be described.

Evaluation of Rise-Up of Charging

The evaluation of the rise-up of charging was performed by measuring the change in concentration when images with different image printing ratio densities were outputted. An image with a low image ratio is outputted, thereby saturating the charging of the toner in the developing machine. Then, an image with a high image ratio is outputted. Then, the difference in charging between the toner saturated in charging in the developing machine and the toner additionally supplied into the developing machine causes a change in density. Immediately after supply of the toner with a high rise-up speed of charging into a developing machine, charging is saturated. For this reason, the change in density is reduced. On the other hand, the toner with a low rise-up speed of charging requires time to be saturated in charging after having been supplied into the developing machine. For this reason, the charging amount of the whole toner is reduced, resulting in a change in density.

Using a full-color copier image Press C800 manufactured by Canon as an image forming apparatus, the two-component developer was placed in a developing device for cyan of the image forming apparatus, and the toner was placed in a toner container for cyan. Thus, evaluation described later was performed.

The conversion point resides in that the mechanism for discharging the excess magnetic carrier inside the developing device inside the developing device was removed from the developing device. For evaluation paper, plain paper GF-0081 (A4, basis weight 81.4 g/m², commercially available from Canon Marketing Japan Inc.) was used.

Adjustment was carried out so that the loading amount of the toner onto paper in a FFh image (solid image) becomes 0.45 mg/cm². FFh is the value showing a 256 gradation in hexadecimal, and 00h is the first gradation (white background) of 256 gradations, and FF is the 256th gradation (solid part) of 256 gradations.

First, an image output test of 1000 prints was performed at an image ratio of 1%. During continuous feeding of 1000 prints, paper feeding was performed under the same development conditions and transfer conditions (without calibration) as those for the first print.

Subsequently, an image output test of 1000 prints was performed at an image ratio of 80%. During continuous feeding of 1000 prints, paper feeding was performed under the same development conditions and transfer conditions (without calibration) as those for the first print.

The image density of the 1000th print in printing at an image ratio of 1% was assumed to be the initial density. The density of the 1000th image in printing at an image ratio of 80% was measured, and was evaluated according to the following evaluation criteria. The evaluation results are shown in Table 10-1 and 10-2.

The tests were performed under normal temperature normal humidity environment (N/N; temperature 23° C., relative humidity 50% RH), and under normal temperature low humidity environment (N/L; temperature 23° C., relative humidity 5% RH).

(1) Measurement of Change in Image Density

Using an X-Rite color reflection densitometer (500 series: manufactured by X-Rite Co.), the initial density and the density of the 1000th image in printing at an image ratio of 80% were measured, and were rated according to the following criteria. The evaluation results are shown in Table 8. D or higher was judged as having acquired the effects of the present invention.

Change in Density
  A: less than 0.02
  B: from 0.02 to less than 0.04
  C: from 0.04 to less than 0.06
  D: from 0.06 to less than 0.10
  E: 0.10 or more Charging Maintaining Property Under High-Temperature High-Humidity Environment The toner on an electrostatic latent image bearing member was collected by suction using a metal cylindrical tube and a cylindrical filter, thereby calculating the triboelectric charging amount of the toner.

Specifically, the triboelectric charging amount of the toner on the electrostatic latent image bearing member was measured by a Faraday-Cage. The Faraday-Cage is a coaxial double tube in which the inner tube and the outer tube are insulated from each other. When a charged body with an electric charge amount Q is placed in the inner tube, electrostatic induction leads to a situation as if there is a metal cylindrical tube with the electric charge amount Q. The induced electric charge amount was measured by an electrometer (Keithley 6517A manufactured by Keithley Co.), and the value obtained by dividing the electric charge amount Q (mC) by the mass M (kg) of the toner in the inner tube was referred to as the triboelectric charging amount of the toner.

Triboelectric charging amount (mC/kg) of toner=$Q/M$

First, the evaluation image was formed on the electrostatic latent image bearing member. Before transferring the image to the intermediate transfer member, the rotation of the electrostatic latent image bearing member was stopped, and the toner on the electrostatic latent image bearing member was collected by suction by the metal cylindrical tube and the cylindrical filter, thereby measuring the [initial Q/M].

Continuously, the developing device was allowed to stand still for two weeks while being placed in an evaluation machine under high-temperature high-humidity environment (H/H; temperature 30° C., relative humidity 80% RH). Then, the same operations as those before standing still were performed, thereby measuring the electric charge amount Q/M (mC/kg) per unit mass on the electrostatic latent image bearing member after standing still. With the initial Q/M per unit mass on the electrostatic latent image bearing member taken as 100%, the retention rate of Q/M per unit mass on the electrostatic latent image bearing member after standing still ([Q/M after standing still]/[initial Q/M]×100) was calculated, and judged based on the following criteria. D or higher was judged as having acquired the effects of the present invention.

Evaluation Criteria
  A: retention rate is 95% or more
  B: retention rate is from 90% to less than 95%
  C: retention rate is from 85% to less than 90%
  D: retention rate is from 80% to less than 85%
  E: retention rate is less than 80%

Evaluation of Low-temperature Fixability of Toner

Paper: GFC-081 (81.0 g/m²)
(commercially available from Canon Marketing Japan Inc.)
Loading amount of toner on paper: 0.50 mg/cm²
(adjusted by direct-current voltage VDC of the developer bearing member, the charging voltage VD of the electrostatic latent image bearing member, and the laser power)
Evaluation image: an image of 2 cm×5 cm is arranged at the center of the A4 paper
Test environment: low temperature low humidity environment: temperature 15° C./relative humidity 10% RH (hereinafter "L/L")
Fixation temperature: 130° C.
Process speed: 377 mm/sec The evaluation image was outputted, and the low-temperature fixability was evaluated. The value of the image density reduction rate was taken as the evaluation criterion of the low-temperature fixability. For the image density reduction rate, using a X-Rite color reflection densitometer (500 series: manufactured by X-Rite Co.), first, the image density of the central part was measured. Then, the portion whose image density was measured was applied with a load of 4.9 kPa (50 g/cm²). Thus, the fixing image was subjected to rubbing (5 reciprocations) by lens-cleaning paper, and the image density was measured again. Then, using the following equation, the reduction rate between before and after rubbing was calculated. The reduction rate of the resulting image density was evaluated according to the following evaluation criteria. D or higher was judged as having acquired the effects of the present invention.

Reduction rate of image density=(image density before friction−image density after friction)/image density before friction×100

Evaluation Criteria

| | |
|---|---|
| A: reduction rate of image density | less than 3.0% |
| B: reduction rate of image density | from 3.0% to less than 5.0% |
| C: reduction rate of image density | from 5.0% to less than 15.0% |
| D: reduction rate of image density | from 10.0% to less than 15.0% |
| E: reduction rate of image density | 15.0% or more |

The evaluation results of two-component developers 1 to 46 are shown in Table 10-1 and 10-2.

TABLE 10-1

| Example | Two-component developer No. | Low-temperature fixability Rank | Rise-up of charging under N/N Rank | Rise-up of charging under N/L Rank | Charging maintaining property under H/H Rank |
|---|---|---|---|---|---|
| Example 1 | 1 | A | A | A | A |
| Example 2 | 2 | A | A | A | A |
| Example 3 | 3 | A | A | B | A |
| Example 4 | 4 | A | B | B | A |
| Example 5 | 5 | A | B | C | A |
| Example 6 | 6 | A | B | C | A |
| Example 7 | 7 | A | B | C | A |
| Example 8 | 8 | A | C | C | A |
| Example 9 | 9 | A | C | D | A |
| Example 10 | 10 | A | B | C | A |
| Example 11 | 11 | A | C | C | A |
| Example 12 | 12 | A | D | D | A |
| Example 13 | 13 | A | A | B | B |
| Example 14 | 14 | A | A | B | C |
| Example 15 | 15 | B | A | B | A |
| Example 16 | 16 | C | A | B | A |
| Example 17 | 17 | A | A | B | A |
| Example 18 | 18 | A | A | B | A |
| Example 19 | 19 | B | B | C | B |
| Example 20 | 20 | C | A | B | C |
| Example 21 | 21 | C | A | B | C |
| Example 22 | 22 | A | A | B | C |
| Example 23 | 23 | A | A | B | D |
| Example 24 | 24 | A | A | B | D |
| Example 25 | 25 | A | B | C | A |
| Example 26 | 26 | C | B | C | A |
| Example 27 | 27 | C | A | B | B |
| Example 28 | 28 | A | A | B | C |
| Example 29 | 29 | C | A | B | D |
| Example 30 | 30 | A | A | B | C |
| Example 31 | 31 | C | B | C | A |
| Example 32 | 32 | C | B | C | A |
| Example 33 | 33 | A | A | B | B |
| Example 34 | 34 | A | A | B | B |
| Example 35 | 35 | A | B | B | A |
| Example 36 | 36 | A | B | C | A |
| Example 37 | 37 | C | C | D | D |

TABLE 10-2

| Comparative Example | Two-component developer No. | Low-temperature fixability Rank | Rise-up of charging under N/N Rank | Rise-up of charging under N/L Rank | Charging maintaining property under H/H Rank |
|---|---|---|---|---|---|
| Comparative Example 1 | 38 | A | D | E | E |
| Comparative Example 2 | 39 | A | E | E | A |
| Comparative Example 3 | 40 | A | D | E | E |
| Comparative Example 4 | 41 | A | A | B | E |
| Comparative Example 5 | 42 | A | E | E | E |

TABLE 10-2-continued

| Comparative Example | Two-component developer No. | Low-temperature fixability Rank | Rise-up of charging under N/N Rank | Rise-up of charging under N/L Rank | Charging maintaining property under H/H Rank |
|---|---|---|---|---|---|
| Comparative Example 6 | 43 | A | E | E | A |
| Comparative Example 7 | 44 | A | E | E | A |
| Comparative Example 8 | 45 | A | E | E | A |
| Comparative Example 9 | 46 | A | E | E | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113105, filed Jun. 13, 2018, Japanese Patent Application No. 2019-074933, filed Apr. 10, 2019, which are hereby incorporated by reference herein in their entirety.

What is claimed is:

1. A two-component developer, comprising:
a toner including a toner particle that includes a binder resin including a polymer A having a first monomer unit derived from a first polymerizable monomer, and a second monomer unit derived from a second polymerizable monomer that is different from the first polymerizable monomer, the first polymerizable monomer being at least one member selected from the group consisting of (meth)acrylic acid esters having a $C_{18-36}$ alkyl group; and
a magnetic carrier having a magnetic core with a coating resin on a surface of the magnetic core, the coating resin including a polymer B having a monomer unit (a) derived from a polymerizable monomer (a), and a monomer unit (b) derived from a polymerizable monomer (b) that is different from polymerizable monomer (a), wherein
a content of the first monomer unit in the polymer A is 5.0 to 60.0 mol % based on the total number of moles of all the monomer units in polymer A,
a content of the second monomer unit in the polymer A is 20.0 to 95.0 mol % based on the total number of moles of all the monomer units in polymer A, $$3.00 \leq (SP_{21} - SP_{11}) \leq 25.00 \text{ and } 21.00 \leq SP_{21}$$

when $SP_{11}$ $(J/cm^3)^{0.5}$ is an SP value of the first monomer unit and $SP_{21}$ $(J/cm^3)^{0.5}$ is an SP value of the second monomer unit, and $$20.30 \leq SP(a) \leq 22.00 \text{ and } 19.00 \leq SP(b) \leq 20.20$$

when SP(a) $(J/cm^3)^{0.5}$ is an SP value of monomer unit (a) and SP(b) $(J/cm^3)^{0.5}$ is an SP value of monomer unit (b).

2. The two-component developer according to claim 1, wherein the content of the second monomer unit in polymer A is 40.0 to 95.0 mol % based on the total number of moles of all the monomer units in the polymer A.

3. The two-component developer according to claim 1, wherein the first polymerizable monomer is at least one member selected from the group consisting of (meth)acrylic acid esters having a straight-chain alkyl group having 18 to 36 carbon atoms.

4. The two-component developer according to claim 1, wherein the second polymerizable monomer is at least one member selected from the group consisting of formulae (A) and (B)

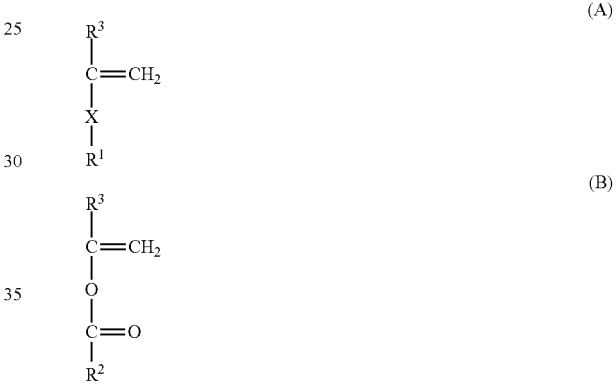

where X represents a single bond or an alkylene group having 1 to 6 carbon atoms,
$R^1$ represents $-C \equiv N$, $-C(=O)NHR^{10}$ where $R^{10}$ is a hydrogen atom or a $C_{1-4}$ alkyl group, a hydroxy group, $-COOR^{11}$ where $R^{11}$ is a $C_{1-6}$ alkyl group or a $C_{1-6}$ hydroxyalkyl group, $-NHCOOR^{12}$ where $R^{12}$ is a $C_{1-4}$ alkyl group, $-NH-C(=O)-N(R^{13})_2$ where $R^{13}$s are independently a hydrogen atom or a $C_{1-6}$ alkyl group, $-COO(CH_2)_2NHCOOR^{14}$ where $R^{15}$ is a $C_{1-4}$ alkyl group, or $-COO(CH_2)_2-NH-C(=O)-N(R^{15})_2$ where $R^{15}$s are independently a hydrogen atom or a $C_{1-6}$ alkyl group,
$R^2$ is a $C_{1-4}$ alkyl group, and
$R^3$ is a hydrogen atom or a methyl group.

5. The two-component developer according to claim 1, wherein the second polymerizable monomer is at least one member selected from the group consisting of formulae (A) and (B)

-continued

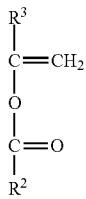
(B)

where X represents a single bond or an alkylene group having 1 to 6 carbon atoms, $R^1$ represents $-C\equiv N$, $-C(=O)NHR^{10}$ where $R^{10}$ is a hydrogen atom or a $C_{1-4}$ alkyl group, a hydroxy group, $-COOR^{11}$ where $R^{11}$ is a $C_{1-6}$ alkyl group or a $C_{1-6}$ hydroxyalkyl group, $-COO(CH_2)_2NHCOOR^{14}$ where $R^{14}$ is a $C_{1-4}$ alkyl group, or $-COO(CH_2)_2-NH-C(=O)-N(R^{15})_2$ where $R^{15}$s are independently a hydrogen atom or a $C_{1-6}$ alkyl group, $R^2$ is a $C_{1-4}$ alkyl group, and $R^3$ is a hydrogen atom or a methyl group.

6. The two-component developer according to claim 1, wherein polymer A further includes a third monomer unit derived from a third polymerizable monomer that is different from both the first and second polymerizable monomers, the third monomer unit being derived from at least one polymerizable monomer selected from the group consisting of styrene, methyl methacrylate and methyl acrylate.

7. The two-component developer according to claim 6, wherein the third monomer unit is derived from styrene.

8. The two-component developer according to claim 1, wherein the content of the polymer A is 50 mass % or more based on the total mass of the binder resin.

9. The two-component developer according to claim 1, wherein the glass transition temperature of the coating resin is 40 to 100° C.

10. The two-component developer according to claim 1, wherein the content of monomer unit (a) is 10.0 to 90.0 mol % based on the total number of moles of all the monomer units in the polymer B, and
the content of monomer unit (b) is 10.0 to 90.0 mol % based on the total number of moles of all the monomer units in the polymer B.

11. The two-component developer according to claim 1, wherein the polymerizable monomer (a) is at least one member selected from the group consisting of alkyl esters of (meth)acrylic acid each having a $C_{1-4}$ alkyl group.

12. The two-component developer according to claim 1, wherein the polymerizable monomer (b) is at least one member selected from the group consisting of cycloalkyl esters of a (meth)acrylic acid having a $C_{3-8}$ cycloalkyl group.

13. The two-component developer according to claim 1, wherein the content of the polymer B is 50 mass % or more based on the total mass of the coating resin.

14. The two-component developer according to claim 1, wherein $0.20 \leq E/F \leq 7.00$
where E represents the ratio of the total number of moles of the second monomer unit to the total number of moles of all the monomer units in the polymer A, and F represents the ratio of the total number of moles of monomer unit (a) to the total number of moles of all the monomer units in polymer B.

15. The two-component developer according to claim 1, wherein the time constant of charging of the two-component developer is 10 to 500 seconds.

16. The two-component developer according to claim 1, wherein polymer A is a vinyl polymer.

17. The two-component developer according to claim 1, wherein the magnetic core is a porous magnetic core having a resin-filled magnetic core particle with a filler resin present in a void of the porous magnetic core,
in the pore diameter distribution of the porous magnetic core, the peak pore diameter resulting in the maximum differential pore volume within the range of 0.1 to 3.0 µm is 0.20 to 0.70 µm, and the pore volume of the integration value of the differential pore volume within the range of 0.1 to 3.0 µm is 20 to 57 mm³/g, and
$0.20 \leq MR2/MR1 \leq 0.90$ in regions R1 and R2 of the magnetic carrier,
where MR1 represents JR1/FR1, and MR2 represents JR2/FR2 in which JR1 and JR2 each represent the ratio on a mass basis of the composition derived from a resin component, and FR1 and FR2 each represent the ratio on a mass basis of the composition derived from the porous magnetic core,
in a cross sectional image of the magnetic carrier region R1 is a region surrounded by the contour line of the resin-filled magnetic core particle, straight lines A, B, and D, and in contact with a straight line C, in which the straight lines A and B are two straight lines extending in parallel with a line segment passing through the center of gravity of the cross section and having a maximum length in the resin-filled magnetic core particle, and being apart from the line segment by 2.5 µm; the straight line C is a straight line passing through the point of intersection of the line segment and the contour line of the resin-filled magnetic core particle and being orthogonal to the line segment; and the straight line D is a straight line in parallel with the straight line C, and being apart from the straight line C in the direction of center of the magnetic carrier by 5.0 µm, and
in the cross sectional image of the magnetic carrier region R2 is a region surrounded by the straight lines A, B, and D, and a straight line E that is in parallel with the straight line D and is apart from the straight line D in the direction of center of the magnetic carrier by 5.0 µm.

18. The two-component developer according to claim 1, wherein the magnetic core is a magnetic body-dispersed resin carrier core material,
the magnetic body-dispersed resin carrier core material includes a magnetic particle A with a number average particle diameter of a primary particle of ra (µm) and a magnetic particle B with a number average particle diameter of a primary particle of rb (µm) satisfying ra≥rb,
the magnetic particle A includes an oxide of an iron oxide and at least one nonferrous metal element selected from the group consisting of manganese element, aluminum element, magnesium element, titanium element and nickel element,
the ratio (M1/F1) is 0.010 to 0.100 where M1 (mass %) represents the total content of the nonferrous metal elements and F1 (mass %) represents the content of the iron element in measurement with a fluorescent X-ray diffraction method of the magnetic carrier, and
the ratio (M2/F2) is 1.0 to 10.0 where M2 (mass %) represents the total content of the nonferrous metal elements and F2 (mass %) represents the content of the iron element in measurement with X-ray photoelectron spectroscopy of the magnetic carrier.

19. The two-component developer according to claim 1, wherein the content of the first monomer unit in polymer A is 10.0 to 40.0 mol % based on the total number of moles of all the monomer units in polymer A, the content of the second monomer unit in polymer A is 40.0 to 70.0 mol % based on the total number of moles of all the monomer units in polymer A.

20. A two-component developer, comprising:

a toner including a toner particle that includes a binder resin including a polymer A that is a polymer derived from a composition containing a first polymerizable monomer, and a second polymerizable monomer that is different from the first polymerizable monomer, the first polymerizable monomer being at least one member selected from the group consisting of (meth)acrylic acid esters having a $C_{18-36}$ alkyl group; and a magnetic carrier having a magnetic core and a coating resin of the surface of the magnetic core, the coating resin including a polymer B having a monomer unit (a) derived from a polymerizable monomer (a), and a monomer unit (b) derived from a polymerizable monomer (b) different from the polymerizable monomer (a), wherein a content of the first polymerizable monomer in the composition is 5.0 to 60.0 mol % based on the total number of moles of all polymerizable monomers in the composition, a content of the second polymerizable monomer in the composition is 20.0 to 95.0 mol % based on the total number of moles of all polymerizable monomers in the composition, $$0.60 \leq (SP_{22} - SP_{12}) \leq 15.00 \text{ and } 18.30 \leq SP_{22}$$

when $SP_{12}$ $(J/cm^3)^{0.5}$ is an SP value of the first polymerizable monomer and $SP_{22}$ $(J/cm^3)^{0.5}$ is an SP value of the second polymerizable monomer, and $$20.30 \leq SP(a) \leq 22.00 \text{ and } 19.00 \leq SP(b) \leq 20.20$$

when $SP(a)$ $(J/cm^3)^{0.5}$ is an SP value of monomer unit (a) and $SP(b)$ $(J/cm^3)^{0.5}$ is an SP value of monomer unit (b).

21. The two-component developer according to claim 20, wherein the content of the second polymerizable monomer in the composition is 40.0 to 95.0 mol % based on the total number of moles of all the polymerizable monomers in the composition.

22. The two-component developer according to claim 20, wherein the content of the first polymerizable monomer in the composition is 10.0 to 40.0 mol % based on the total number of moles of all the polymerizable monomers in the composition, the content of the second polymerizable monomer in the composition is 40.0 to 70.0 mol % based on the total number of moles of all the polymerizable monomers in the composition.

23. The two-component developer according to claim 20, wherein the composition further contains styrene.

* * * * *